(12) United States Patent
Katoh et al.

(10) Patent No.: US 9,353,274 B1
(45) Date of Patent: May 31, 2016

(54) INK, INK CARTRIDGE, INKJET RECORDING DEVICE, AND COPOLYMER

(71) Applicants: Keita Katoh, Kanagawa (JP); Shigeyuki Harada, Shizuoka (JP); Yoshiki Yanagawa, Shizuoka (JP); Masayuki Fukuoka, Shizuoka (JP); Kazukiyo Nagai, Shizuoka (JP); Tomoyuki Shimada, Shizuoka (JP); Akiyoshi Sabu, Shizuoka (JP); Yuusuke Koizuka, Shizuoka (JP)

(72) Inventors: Keita Katoh, Kanagawa (JP); Shigeyuki Harada, Shizuoka (JP); Yoshiki Yanagawa, Shizuoka (JP); Masayuki Fukuoka, Shizuoka (JP); Kazukiyo Nagai, Shizuoka (JP); Tomoyuki Shimada, Shizuoka (JP); Akiyoshi Sabu, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/928,230

(22) Filed: Oct. 30, 2015

(30) Foreign Application Priority Data

Nov. 12, 2014 (JP) ................................. 2014-229638

(51) Int. Cl.
*C09D 11/30* (2014.01)
*C08F 222/10* (2006.01)
*C09D 133/14* (2006.01)

(52) U.S. Cl.
CPC .............. *C09D 11/30* (2013.01); *C08F 222/10* (2013.01); *C09D 133/14* (2013.01)

(58) Field of Classification Search
CPC .... C09D 11/30; C09D 133/14; C09D 125/14; C09D 11/32; C08F 222/10; C08K 5/41
See application file for complete search history.

(56) References Cited

U.S. PATENT DOCUMENTS 5,254,158 A * 10/1993 Breton ................... C09D 11/30 106/31.35
2014/0072779 A1 3/2014 Matsuyama et al.

(Continued)

FOREIGN PATENT DOCUMENTS

JP 3-160068 7/1991
JP 2003-506536 2/2003

(Continued)

*Primary Examiner* — Thinh Nguyen
(74) *Attorney, Agent, or Firm* — Oblon, McClelland, Maier & Neustadt, L.L.P

(57) ABSTRACT

An ink includes water, a pigment, and a copolymer, wherein the copolymer contains a structure unit represented by the following Chemical formula 1, Chemical formula 1

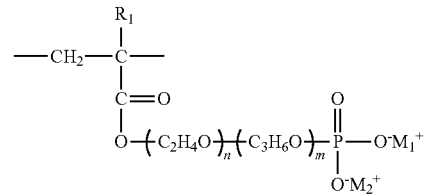

where $R_1$ represents a hydrogen atom or a methyl group, $M_1^+$ and $M_2^+$ each, independently represent monovalent cations, n and m each, independently represent 0 or integers of from 1 to 6 excluding a case where both are 0 and a structure unit represented by the following Chemical formula 2, Chemical formula 2

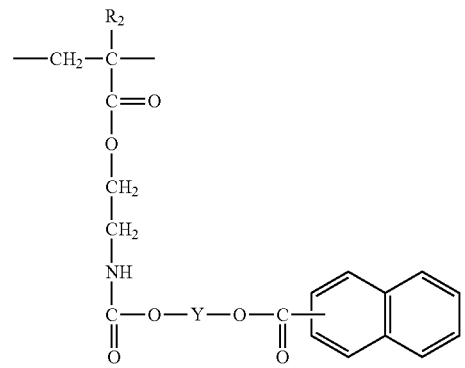

where $R_2$ represents a hydrogen atom or a methyl group, Y represents an alkylene group having 2 to 18 carbon atoms.

10 Claims, 5 Drawing Sheets

(56) References Cited

U.S. PATENT DOCUMENTS

| | | |
|---|---|---|
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0252203 A1 | 9/2015 | Matsuyama et al. |
| 2015/0259555 A1 | 9/2015 | Katoh et al. |

FOREIGN PATENT DOCUMENTS

| | | |
|---|---|---|
| JP | 2005-298802 | 10/2005 |
| JP | 2006-188624 | 7/2006 |
| JP | 2008-536963 | 9/2008 |
| JP | 2011-105866 | 6/2011 |
| JP | 2011-122072 | 6/2011 |
| JP | 2012-051357 | 3/2012 |
| JP | 2012-052027 | 3/2012 |
| JP | 2014-132056 | 7/2014 |
| WO | WO01/10918 A1 | 2/2001 |
| WO | WO2006/099551 A2 | 9/2006 |
| WO | WO2007/053563 A2 | 5/2007 |

* cited by examiner

INK, INK CARTRIDGE, INKJET RECORDING DEVICE, AND COPOLYMER

CROSS-REFERENCE TO RELATED APPLICATIONS

This patent application is based on and claims priority pursuant to 35 U.S.C. §119(a) to Japanese Patent Application No. 2014-229638 filed on Nov. 12, 2014, in the Japan Patent Office, the entire disclosures of which are hereby incorporated by reference herein.

BACKGROUND

1. Technical Field

The present invention relates to ink, an ink cartridge, an inkjet recording device, and a copolymer.

2. Background Art

Inkjet recording methods are advantageous in comparison with other recording methods in that the process is simple, full colorization is easy, and high resolution images can be obtained by a device having a simple configuration. For this reason, the inkjet recording is widely diffusing from home use to office use, commercial printing, and industrial printing.

For office use, typically plain paper is used as a recording medium and high image density is demanded.

In addition, in the commercial printing and industrial printing, other kinds of paper such as coated paper and art paper are also used.

In such an inkjet recording method, mostly aqueous ink using water soluble dye as a colorant is used. However, its water resistance and light resistance are inferior, which accelerates development of a pigment ink using a water insoluble pigment in place of the water soluble dye.

In general, when images are printed on plain paper using pigment ink, the pigment ink permeates into the paper, so that the pigment density on the surface decreases, thereby lowering the image density. If the pigment concentration in the pigment ink increases, the image density increases. However, the pigment ink becomes viscous, thereby degrading discharging stability of the ink.

SUMMARY

According to the present disclosure, provided is an improved ink that includes water, a pigment, and a copolymer, wherein the copolymer contains a structure unit represented by the following Chemical formula 1, Chemical formula 1

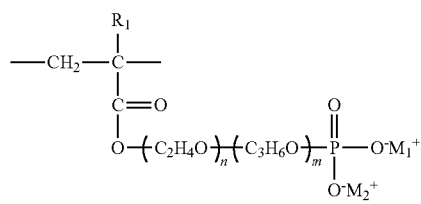

where $R_1$ represents a hydrogen atom or a methyl group, $M_1^+$ and $M_2^+$ each, independently represent monovalent cations, n and m each, independently represent 0 or integers of from 1 to 6 excluding a case where both are 0 and a structure unit represented by the following Chemical formula 2, Chemical formula 2

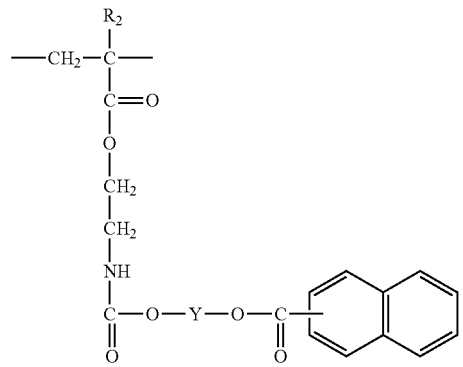

where $R_2$ represents a hydrogen atom or a methyl group and Y represents an alkylene group having 2 to 18 carbon atoms.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
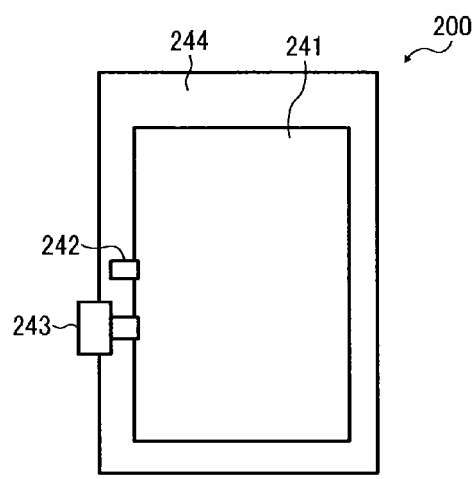
FIG. 1 is a diagram illustrating an example of the ink cartridge.

The ink of the present disclosure has excellent storage stability, discharging stability, and image density on plain paper so that occurrence of beading of images formed on coated paper is inhibited by using the ink of the present disclosure.

Embodiments of the present disclosure are described with reference to accompanying drawings.

The ink of the present disclosure includes a structure unit represented by Chemical formula 1 and a structure unit represented by Chemical formula 2.

Chemical formula 1

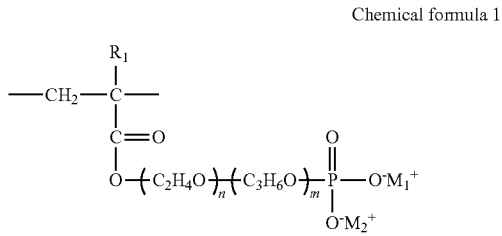

where $R_1$ represents a hydrogen atom or a methyl group, $M_1^+$ and $M_2^+$ each, independently represent monovalent cations, n and m each, independently represent 0 or integers of from 1 to 6 excluding a case where both are 0.

Chemical formula 2

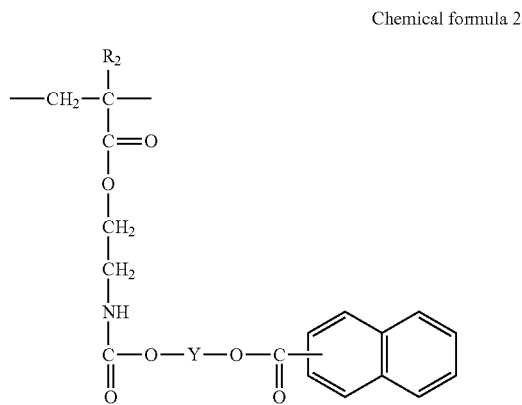

where $R_2$ represents a hydrogen atom or a methyl group, Y represents an alkylene group having 2 to 18 carbon atoms.

The group represented by the following Chemical formula 1-1 in the Chemical formula 1 indicates hydrophilicity but becomes hydrophobic in reaction with a multi-valent metal ion such as calcium ion, magnesium ion, and aluminum ion.

Chemical formula 1-1

Therefore, if ink containing the copolymer having the structure unit represented by the Chemical formula 1 as a binder resin or a pigment dispersant is attached to a recording medium containing salts (such as calcium carbonate) of the metal ions mentioned above, the copolymer becomes hydrophobic in the reaction with the multi-valent metal ions eluted from the recording medium. As a result, the ink is thickened and the pigment agglomerates. Consequently, permeation of the pigment into the recording medium is inhibited. This makes it possible to improve the image density on plain paper and also reduce occurrences of beading when forming images on coated paper.

The number of the carbon atoms of Y in the Chemical formula 2 is preferably from 2 to 16 and more preferably from 2 to 12.

The naphthyl group in the Chemical formula 2 is strongly adsorbed with a pigment due to π-π stacking with the pigment. This contributes to improvement of storage stability, discharging stability, the image density on plain paper and also reduction of occurrences of beading when forming an image on coated paper. Since the rate of the copolymer isolated in the ink decreases, increase of the viscosity of the ink due to evaporation of water can be inhibited, thereby improving discharging stability.

In addition, it is possible to increase storage stability of the ink by using the copolymer including the structure unit represented by the Chemical formula 2 when dispersing the pigment in water.

The structure units represented by the Chemical formula 1 and Chemical formula 2 usually form the main chain of the copolymer but part of the units may be a side chain of the copolymer. For example, it is well known that it is difficult to completely exclude additional radical polymerization reaction that produces fork structures.

The molar ratio of the structure unit represented by the Chemical formula 1 to the structure unit represented by the Chemical formula 2 is 0.1 to 10, preferably from 0.3 to 5, and more preferably from 0.5 to 3. When the molar ratio of the structure unit represented by the Chemical formula 1 to the structure unit represented by the Chemical formula 2 is not less than 0.5, the image density is improved. When the molar ratio of the structure unit represented by the Chemical formula 1 to the structure unit represented by the Chemical formula 2 is not greater than 3, storage stability is improved.

The content of the structure unit represented by Chemical formula 1 in the copolymer is from 5 percent by mass to 83 percent by mass, preferably from 13 percent by mass to 71 percent by mass, and more preferably from 20 percent by mass to 60 percent by mass.

The mono-valent cation in $M_1^+$ and $M_2^+$ is not particularly limited. Specific examples thereof include, but are not limited to, proton, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

When $M_1^+$ and/or $M_2^+$ is a proton, the proton is not necessary disassociated.

The copolymer can be synthesized by copolymerizing the monomer represented by the Chemical formula 3, the monomer represented by the Chemical formula 4, and other optional monomers followed by optional neutralization by a base.

Chemical formula 3

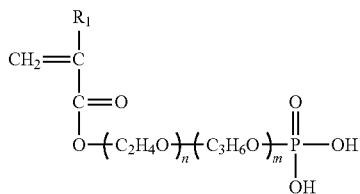

Chemical formula 4

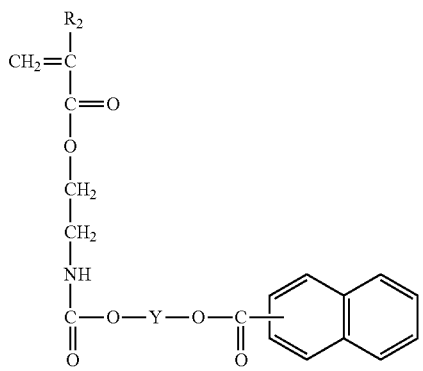

The compound represented by the Chemical formula 3 is not particularly limited. Specific examples thereof include, but are not limited to, 2-methacryloyloxy ethyl acid phosphate represented by the Chemical formula 3-1, 2-acryloyloxy ethyl acid phosphate represented by the Chemical formula 3-2, acid phosphoxy polyoxyethyleneglycol methacrylate represented by the Chemical formula 3-3, acid phosphoxy polyoxypropyleneglycol methacrylate represented by the Chemical formula 3-4, and acid phosphoxy polyoxypoly(oxyethylene oxypropylene)glycol methacrylate represented by the Chemical formula 3-5.

Chemical formula 3-1

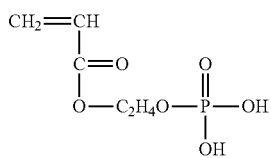

Chemical formula 3-2

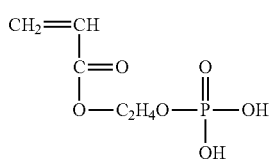

Chemical formula 3-3

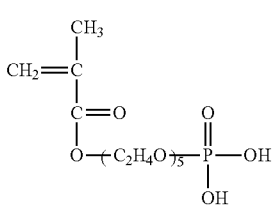

Chemical formula 3-4

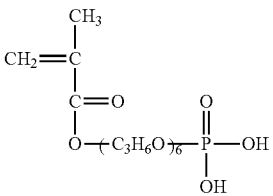

Chemical formula 3-5

Examples of the commercial products of 2-methacryloyloxy ethyl acid phosphate available on market are LIGHT ESTER P1-M (manufactured by Kyoeisha Chemical Co., Ltd.) and Phosmer™ M (manufactured by Uni-Chemical Co., Ltd.).

An example of the commercial product of 2-acryloyloxy ethyl acid phosphate available on market is LIGHT ACRYLATE P-1A (manufactured by Kyoeisha Chemical Co., Ltd.).

An example of the commercial product of acid phosphoxy polyoxyethyleneglycol methacrylate available on market is Phosmer™ PE (manufactured by Uni-Chemical Co., Ltd.).

An example of the commercial product of acid phosphoxy polyoxypropyleneglycol methacrylate available on market is Phosmer™ PP (manufactured by Uni-Chemical Co., Ltd.).

An example of the commercial products of acid phosphoxy poly(oxyethylene oxypropylene)glycol methacrylate is a known compound disclosed in JP-2003-506536-A.

The compound represented by the Chemical formula 4 is not particularly limited. Specific examples thereof include, but are not limited to, the compound represented by the Chemical formula 4-1, the compound represented by the Chemical formula 4-2, the compound represented by the Chemical formula 4-3, and the compound represented by the Chemical formula 4-4

Chemical formula 4-1

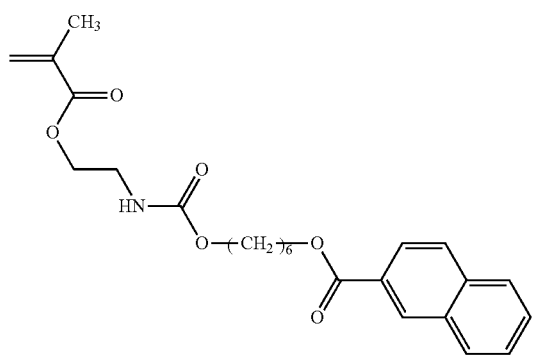

-continued

Chemical formula 4-2

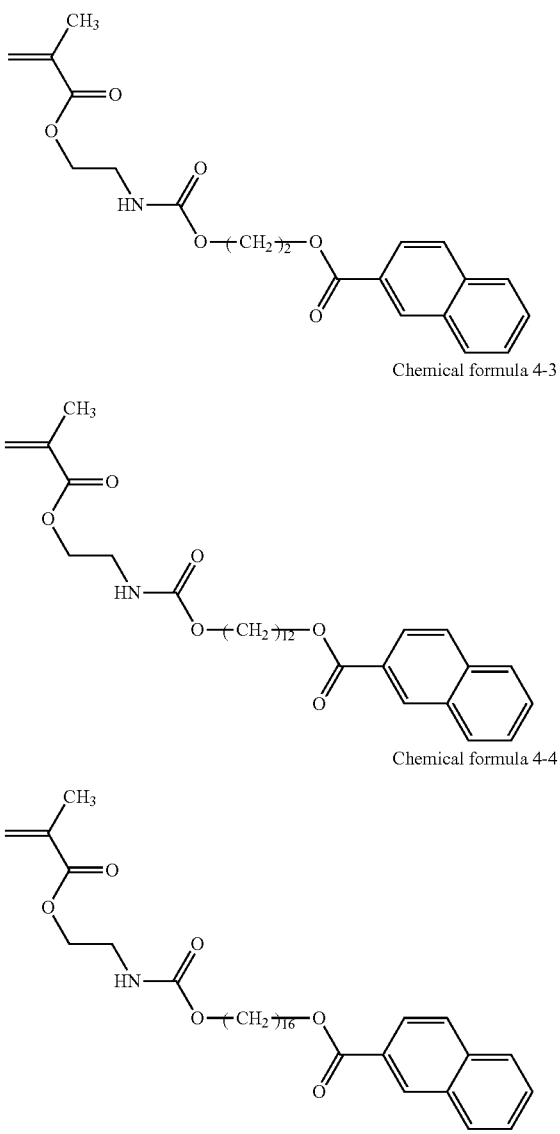

Chemical formula 4-3

Chemical formula 4-4

The compound represented by the Chemical formula 4 has a molecular weight in the range of from 357 to 596.

The compound represented by the Chemical formula 4 can be synthesized by the condensation reaction 1 illustrated below of naphthalene carbonyl chloride (A-1) with an excessive amount of alkane diol (A-2) under the presence of an acid acceptor such as amine and pyridine to obtain naphthalene carboxylic acid hydroxyalkylester (A-3) followed by reaction with 2-methacyloyloxy ethylisocyanate (A-4).

Condensation reaction 1

Chemical formula 4

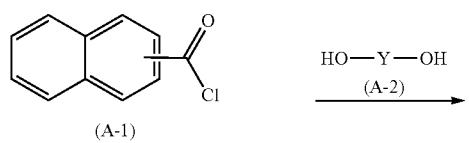

-continued

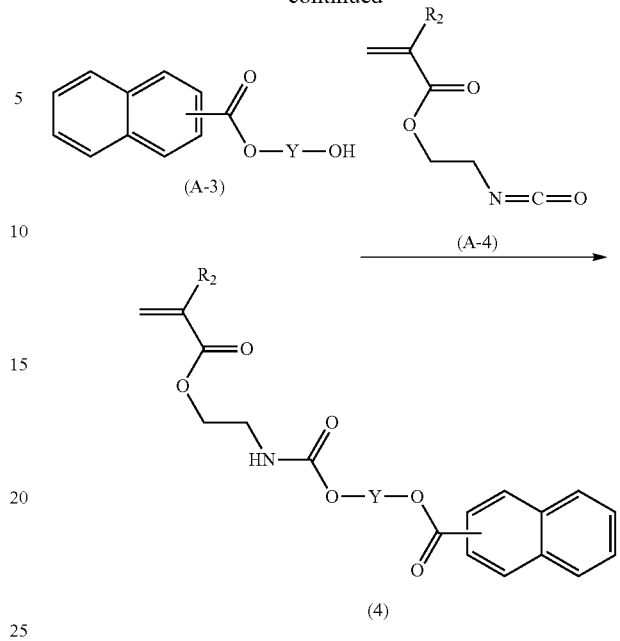

(4)

The copolymer preferably further contains the structure unit represented by the Chemical formula 5, Chemical formula 5

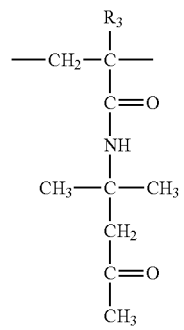

where $R_3$ represents a hydrogen atom or a methyl group. The monomer optionally contains the compound represented by Chemical formula 6.

Chemical formula 6

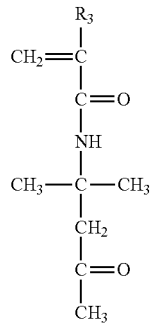

The structure unit represented by the Chemical formula 5 has a high level of affinity with a water soluble organic solvent for use in ink. Accordingly, dispersion of a pigment or a resin is stable even when water in the ink evaporates so that the ratio of the water soluble organic solvent in the ink increases. As a consequence, discharging stability is further improved.

The molar ratio of the structure unit represented by the Chemical formula 5 to the structure unit represented by the Chemical formula 2 is in the range of from 0.1 to 6 and preferably from 0.1 to 4. When the molar ratio of the structure unit represented by the Chemical formula 5 to the structure unit represented by the Chemical formula 2 is not less than 0.1, discharging stability of ink is further enhanced. When the molar ratio is not greater than 6, storage stability of the ink is furthermore improved.

The structure unit represented by the Chemical formula 5 usually forms the main chain of the copolymer but part of the units may be a side chain of the copolymer.

The compound represented by the Chemical formula 6 is not particularly limited. Specific examples thereof include, but are not limited to, diacetone acrylamide and diacetone methacrylamide.

The viscosity of a 10 percent by mass aqueous solution of the copolymer is in the range of from 1.0 mPa·s to 35.0 mPa·s and preferably from 1.5 mPa·s to 25.0 mPa·s at 25 degrees C. When the viscosity of the 10 percent by mass aqueous solution of the copolymer is 1.0 mPa·s or higher at 25 degrees C., reactivity of the metal ion eluted from plain paper and the copolymer ameliorates, so that the image density on plain paper can be furthermore improved. To the contrary, when the viscosity of the 10 percent by mass aqueous solution of the copolymer is 35.0 mPa·s or less at 25 degrees C., the dispersion stability of the pigment is improved, so that the storage stability of the ink is furthermore improved.

The copolymer furthermore optionally contains a structure unit other than the structure units represented by the Chemical formula 1, the Chemical formula 2, and the Chemical formula 5. In this case, the monomer furthermore includes a polymerizable hydrophobic monomer, a polymerizable hydrophilic monomer, polymerizable surfactant, etc.

The polymerizable hydrophobic monomer is not particularly limited. Specific examples thereof include, but are not limited to, unsaturated ethylene monomers having aromatic ring such as styrene, α-methyl styrene, 4-t-butyl styrene, and 4-chloromethyl styrene; (meth)acrlic acid alkyl such as methyl(meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), nonadecyl(meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene.

These may be used alone or in combination of two or more thereof.

The polymerizable hydrophilic monomer is not particularly limited. Specific examples thereof include, but are not limited to, anionic unsaturated ethylene monomers of unsaturated ethylene monomers such as maleic acid or salts thereof, monomethyl maleate, itaconic acid, monomethyl itaconate, fumaric acid, 4-styrene sulfonic acid, 2-acrylic amide-2-methyl propane sulfonic acid, or anionic unsaturated ethylene monomers having phosphoric acid, phosphonic acid, alendronic acid, or etidronic acid; and nonionic unsaturated ethylene monomers such as 2-hydroxyethyl(meth)acrylic acid, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

These may be used alone or in combination of two or more thereof.

The ratio of the total content of the polymerizable hydrophobic monomer and the polymerizable hydrophilic monomer to the total content of the compound having the structure units represented by the Chemical formula 1 and the Chemical formula 2 is in the range of from 0.05 to 1.

The polymerizable surfactant is an anionic or nonionic surfactant having at least one radically-polymerizable unsaturated double bond.

The polymerizable anionic surfactant is not particularly limited. Specific examples thereof include, but are not limited to, a compound having a sulfuric acid salt group such as ammonium sulfate group ($-SO_3-NH_4^+$) and an allyl group ($-CH_2-CH=CH_2$), a compound having a sulfuric acid salt group such as ammonium sulfate group ($-SO_3-NH_4^+$) and a methacyloyl group [$-CO-C(CH_3)=CH_2$], and a compound having a sulfuric acid salt group such as ammonium sulfate group ($-SO_3-NH_4^+$) and a 1-propenyl group ($-CH=CH_2CH_3$).

Examples of the polymerizable anionic surfactant available on market are, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The polymerizable nonionic surfactant is not particularly limited. A specific example thereof is a compound having 1-propenyl group ($-CH=CH_2CH_3$) and a polyoxyethylene group [$-(C_2H_4O)_n-H$].

Examples of the polymerizable nonionic surfactant available on market are, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

These surfactants can be used alone or in combination.

The ratio of the total content of the polymerizable surfactant to the total content of the compound having the structure units represented by the Chemical formula 1 and the Chemical formula 2 is in the range of from 0.001 to 0.1.

It is preferable to synthesize the copolymer by copolymerizing the monomers under the presence of a radical polymerization initiator.

The radical initiator is not particularly limited. Specific examples thereof include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrike), azobis(2,2'-isovaleronitrile), and non-cyano-based dimethyl-2,2'azobis isobutylate. Of these, organic peroxides and azo-based compounds are preferable and azo compounds are particularly preferable in terms that they are easy to control the molecular weight and dissolved at lower temperatures.

The mass ratio of the radical polymerization initiator to the monomers is from 0.01 to 0.1.

To control the molecular weight of the copolymer, a chain transfer agent is optionally added at the copolymerization of the monomers.

The chain transfer agent is not particularly limited. Specific examples thereof include, but are not limited to, mercapto acetate, mercapto propionate, 2-propane thiol, 2-meracapto ethanol, thiophenol, dodecyl mercaptane, 1-dodecane thiol, and thioglycerol.

In addition, the reaction temperature is from 50 degrees C. to 150 degrees C., and preferably from 60 degrees C. to 100 degrees C.

The monomer copolmerization time is from 3 hours to 48 hours.

The pigment is not particularly limited. Inorganic pigments and organic pigments for black or color are suitable.

These can be used alone or in combination. These may be used alone or in combination of two or more thereof.

Specific examples of the inorganic pigments include, but are not limited to, titanium oxide, iron oxide, calcium oxide, barium sulfate, aluminum hydroxide, barium yellow, cadmium red, chrome yellow, and carbon black.

It is suitable to use carbon black having a primary particle diameter of from 15 nm to 40 nm, a specific surface area of from 50 $m^2/g$ to 300 $m^2/g$ according to Brunauer, Emmett, and Teller (BET) method, a dibutylphthalate(DPB) absorption oil amount of from 40 ml/100 g to 150 ml/100 g, a volatile content of from 0.5 percent to 10 percent, and pH of from 2 to 9.

The method of manufacturing carbon black is not particularly limited. Specific examples thereof include, but are not limited to, a contact method, a furnace method, a thermal method, a channel method.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Specific examples of the pigments for black color include, but are not limited to, carbon black (C.I. Pigment Black 7) such as furnace black, lamp black, acetylene black, and channel black, metals such as copper and iron (C.I. Pigment Black 11), and metal oxides such as titanium oxides, and organic pigments such as aniline black (C.I. Pigment Black 1).

Specific examples of the pigments for yellow include, but are not limited to, C.I.Pigment Yellow 1, C.I.Pigment Yellow 2, C.I.Pigment Yellow 3, C.I.Pigment Yellow 12, C.I.Pigment Yellow 13, C.I.Pigment Yellow 14, C.I.Pigment Yellow 16, C.I.Pigment Yellow 17, C.I.Pigment Yellow 73, C.I.Pigment Yellow 74, C.I.Pigment Yellow 75, C.I.Pigment Yellow 83, C.I.Pigment Yellow 93, C.I.Pigment Yellow 95, C.I.Pigment Yellow 97, C.I.Pigment Yellow 98, C.I.Pigment Yellow 114, C.I.Pigment Yellow 120, C.I.Pigment Yellow 128, C.I.Pigment Yellow 129, C.I.Pigment Yellow 138, C.I.Pigment Yellow 150, C.I.Pigment Yellow 151, C.I.Pigment Yellow 154, C.I.Pigment Yellow 155, C.I.Pigment Yellow 174, and C.I.Pigment Yellow 180.

Specific examples of pigments for magenta include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

Specific examples of the pigments for cyan include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pigment Pat Blue 4, and C.I.Pigment Pat Blue 60.

By using C.I.Pigment Yellow 74 as yellow pigment, C.I.Pigment Red 122 and C.I.Pigment Violet 19 as magenta pigment, and C.I.Pigment Blue 15:3 as cyan pigment, it is possible to obtain an ink having an excellent color tone and lightfastness.

In terms of coloring of images, self-dispersible pigments are also usable.

The self-dispersible pigment is preferably anionic.

The anionic self-dispersion pigment is formed by introducing an anionic functional group into the surface of a pigment directly or via another atomic group.

The anionic functional group means more than a half of protons are dissociated at pH 7.0.

The anionic functional group is not particularly limited. Specific examples thereof include, but are not limited to, a carboxyl group, a sulfo group, and a phosphonic acid group. Of these, to improve the optical density of obtained images, a carboxyl group or a phosphonic acid group is preferable.

The pigment into which an anionic group is introduced is not particularly limited. Conventional pigments are suitable.

The method of introducing the anionic functional group into the surface of a pigment. For example, oxidation treatment of carbon black is suitable.

Carbon black can be oxidized by known methods using hypochlorite, ozone water, hydrogen peroxide, chlorite, nitric acid, etc., or other known methods using a diazonium salt, etc.

Specific examples of commercial products of the pigments having a surface into which an anioninc group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

The content of the pigment in the ink is from 0.5 percent by mass to 20 percent by mass and preferably from 1 percent by mass to 10 percent by mass.

In addition, it is preferable to furthermore contain a water soluble organic solvent. Such a water soluble organic solvent makes it possible to improve permeability of ink to plain paper and coated paper and furthermore reduce the occurrence of beading. In addition, it is also possible to inhibit drying of ink due to moisturizing effect.

The water soluble organic solvent is not particularly limited. Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. Of these, in terms of prevention of curling of plain paper, preferred are 3-ethyl-3-hydroxymethyloxetane, isopropylidene glycerol, N,N-dimethyl-β-methoxy propionamide, and N,N-dimethyl-3-buthoxy propionamide. Of these, diethylene glycol, triethylene glycol, 1,3-butanediol, 2,2,4-trimethyl-1,3-pentanediol, and glycerin are excellent to prevent discharge failure ascribable to evaporation of water.

The water soluble organic solvent can be used alone or in combination. These may be used alone or in combination of two or more thereof.

Specific examples of the water soluble organic solvents having good permeation property and relatively low level of wettability include, but are not limited to, 2-ethyl-1,3-hexanediol and 2,2,4-trimethyl-1,3-pentanediol.

Specific examples of the other water soluble organic solvents include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butane diol, 2,4-dimethyl-2,4-pentane diol, 2,5-dimethyl-2,5-hexane diol, and 5-hexene-1,2-diol.

Specific examples of other water-soluble organic solvents that can be used in combination with the above-mentioned water soluble organic solvent include, but are not limited to, alkyl or aryl ethers of polyhydric alcohols such as diethylene glycol monobutyl ether, propyleneglycol monobutyl ether, ethylene glycol monophenyl ether, diethylene glycol monophenyl ether, ethylene glycol monoallyl ether, and tetraethylene glycol chlorophenyl ether; and lower alcohols such as ethanol.

The ink preferably contains a surfactant. Such a surfactant improves permeability of the ink into plain paper or coated paper and furthermore reduces the occurrence of beading.

The surfactant is not particularly limited. Specific examples thereof include, but are not limited to, fluorine-containing surfactants, silicone-based surfactants, anionic surfactants, nonionic surfactants, and ampholytic surfactants.

Of these, fluorine-containing surfactants and silicone-based surfactants are preferable because it can lower the surface tension of the ink to 30 mN/m or less.

These surfactants can be used alone or in combination.

As the fluorine-containing surfactants, for example, a fluorine-containing nonionic surfactant, a fluorine-containing anionic surfactant, a fluorine-containing oligomer type surfactant.

The number of carbon atoms substituted with fluorine atoms of a fluorine-containing surfactant is from 2 to 16 and preferably from 4 to 16.

Specific examples of the fluorine-containing nonionic surfactants include, but are not limited to, a perfluoroalkyl phosphoric acid ester, an adduct of perfluoroalkyl ethylene oxide, and a polyoxyalkylene ether polymer compound having a perfluoroalkylether group in its side chain. Of these, the polyoxyalkylene ether polymer compounds having a perfluoroalkylether group in its side chain is preferable because of its low foaming property.

Specific examples of the fluorine-containing anionic surfactants include, but are not limited to, a perfluoroalkyl sulfonic acid compound, a perfluoroalkyl carboxylic acid compound, a perfluoroalkyl phosphoric acid ester compound, and a polyoxyalkylene ether polymer compound having a perfluoroalkyl ether group in its side chain.

Specific examples of the perfluoroalkyl sulfonic acid compounds include, but are not limited to, a perfluoroalkyl sulfonic acid and a salt of perfluoroalkyl sulfonic acid.

Specific examples of the perfluoroalkyl carboxylic acid compounds include, but are not limited to, a perfluoroalkyl carboxylic acid and a salt of perfluoroalkyl carboxylic acid.

Specific examples of the perfluoroalkyl phosphoric acid ester compounds include, but are not limited to, a perfluoroalkyl phosphoric acid ester and a salt of perfluoroalkyl phosphoric acid esters.

Specific examples of the polyoxyalkylene ether polymer compounds having a perfluoroalkyl ether group in its side chain include, but are not limited to, a polyoxyalkylene ether polymer having a perfluoroalkyl ether group in its side chain, a sulfuric acid ester salt of polyoxyalkylene ether polymer having a perfluoroalkyl ether group in its side chain, and a salt of polyoxyalkylene ether polymers having a perfluoroalkyl ether group in its side chain.

Specific examples of counter ions of fluorine-containing anionic surfactants include, but are not limited to, $Li^+$, $Na^+$, $K^+$, $NH_{4+}$, $^+NH_3(CH_2CH_2OH)$, $^+NH_2(CH_2CH_2OH)_2$, and $^+NH(CH_2CH_2OH)_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company); Ftergent FT-110, FT-250, FT-251, FT-400S, FT-150, and FT-400SW (all manufactured by NEOS COMPANY LIMITED); and POLYFOX PF-136A, PF-156A, PF-151N, PF-154, and PF-159 (manufactured by OMNOVA SOLUTIONS INC.).

The silicone-based surfactants are not particularly limited. Specific examples thereof include, but are not limited to, side chain-modified polydimethyl siloxane, both end-modified polydimethyl siloxane, one end-modified polydimethyl siloxane, and side chain both end-modified polydimethyl siloxane. Of these, it is preferable to use a polyether-modified silicone-based surfactant having a polyoxyethylene group or polyoxyethylene polyoxypropylene group as the modification group.

Specific examples of the anionic surfactants include, but are not limited to, a polyoxyethylene alkylether acetate, a dodecylbenzene sulfonate, a laurate, and a polyoxyethylene alkylether sulfate.

Specific examples of the nonionic surfactants include, but are not limited to, a polyoxyethylene alkylether, a polyoxypropylene alkylether, a polyoxyethylene alkylester, a polyoxy ethylene sorbitan aliphatic ester, a polyoxyethylene alkylphenylether, a polyoxyethylene alkylamine, and a polyoxyethylenealkyl amide.

In addition to the components mentioned above, pH regulators, preservatives and fungicides, corrosion inhibitors, anti-oxidants, ultraviolet absorbents, oxygen absorbents, light stabilizing agents, etc., can be added to the ink.

The pH regulator is not particularly limited that can adjust pH to from 8.5 to 11. Specific examples thereof include, but are not limited to, alcohol amines, hydroxides of alkali metal, hydroxides of ammonium, hydroxides of phosphonium, and carbonates of alkali metal.

Specific examples of the alcohol amines include, but are not limited to, diethanol amine, triethanol amine, and 2-amino-2-ethyl-1,3-propane diol.

Specific examples of the hydroxides of alkali metal include, but are not limited to, lithium hydroxide, sodium hydroxide, and potassium hydroxide.

Specific examples of the hydroxides of ammonium include, but are not limited to, ammonium hydroxide and hydroxides of quaternary ammonium.

A specific example of the hydroxides of phosphonium is a hydroxide of quaternary phosphonium.

Specific examples of the carbonates of alkali metal include, but are not limited to, lithium carbonate, sodium carbonate, and potassium carbonate.

The preservatives and fungicides are not particularly limited. Specific examples thereof include, but are not limited, dehydrosodium acetate, sodium sorbinate, 2-pyridine thiol-1-oxide sodium, sodium benzoate, and pentachlorophenol sodium.

The corrosion inhibitors are not particularly limited. Specific examples thereof include, but are not limited to, acid sulfite, thiosodium sulfate, ammonium thiodiglycolate, diisopropyl ammonium nitrite, pentaerythritol tetranitrate, and dicyclohexyl ammonium nitrite.

The anti-oxidants are not particularly limited. Specific examples thereof include, but are not limited to, phenol-based anti-oxidants (including hindered phenol-based anti-oxidants), amine-based anti-oxidants, sulfur-based anti-oxidants, and phosphorus-based anti-oxidants.

The ultraviolet absorbers are not particularly limited. Specific examples thereof include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

The ink can be manufactured by dissolving or dispersing a composition containing a pigment and a copolymer in a solvent containing water followed by stirring and mixing.

The copolymer may be used as a pigment dispersion resin during preparation of a pigment dispersion.

When dissolving or dispersing a composition in a solvent, it is possible to use a sand mill, a homogenizer, a ball mill, a paint shaker, and an ultrasonic dispersion device.

A stirrer using a stirring blade, a magnetic stirrer, a high performance disperser etc., can be used to stir or mix a liquid in which a composition is dissolved or dispersed in a solvent.

During manufacturing of the ink, it is preferable to filter coarse particles with a filter, a centrifuge, etc. followed by degassing.

The viscosity of the ink at 25 degrees C. is 3 mPa·s to 20 mPa·s. When the viscosity of the ink at 25 degrees C. is 3 mPa·S or greater, the image density and text quality are improved. When the viscosity of the ink at 25 degrees C. is 20 mPa·S or less, dischargeability of the ink is improved.

The viscosity of the ink at 25 degrees C. can be measured by, for example, a viscometer (RE-80L, manufactured by TOKI SANGYO CO., LTD.).

The surface tension of the ink at 25 degrees C. is 40 mN/m or less.

The ink can be contained in a container, which can be used as an ink cartridge.

The container is not particularly limited. For example, an ink bag made of aluminum laminate film, a resin film, etc. is suitable.

FIG. 1 is a diagram illustrating an example of the ink cartridge.

In an ink cartridge 200, an ink bag 241 is filled with ink through an ink inlet 242. Subsequent to degassing of the air remaining in the ink bag 241, the ink inlet 242 is closed by fusion. The ink bag 241 is disposed in a plastic cartridge housing 244.

The ink cartridge 200 is detachably attachable to a known inkjet recording device. The ink is supplied into the inkjet recording device by inserting the needle of the inkjet recording device into an outlet 243 made of rubber.

The ink can be applied to writing materials such as a felt pen, a ball-point pen, and a plotter pen. This makes it possible to improve color density on plain paper, in particular white plain paper.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described with reference to Examples but not limited thereto.

Synthesis of Compound Represented by Chemical Formula 4-1

62.0 g (525 mmol) of 1,6-hexanediol (manufactured by Tokyo Chemical Industry Co., Ltd.) was dissolved in 700 mL of methylene chloride (dichloromethane) and 20.7 g (262 mmol) of pyridine was further added. To this solution, a solution in which 50.0 g (262 mmol) of 2-naphthalene carbonyl chloride (manufacture by Tokyo Chemical Industry Co., Ltd.) was dissolved in 100 ml of dichloromethane was dripped in two hours followed by stirring at room temperature for six hours. Subsequent to rinsing with water, an organic phase was isolated. Next, after drying the organic phase with magnesium sulfide, the solvent was removed. The resultant was furthermore refined by silica gel column chromatography with a solvent mixture of a dichloromethane and methanol with a volume ratio of 98:2 serving as an eluent to obtain 52.5 g of 2-naphthoic acid-2-hydroxyethyl ester.

Next, 42.1 g (155 mmol) of 2-naphthoic acid-2-hydroxyethyl ester was dissolved in 80 mL of dried methylethylketone followed by heating to 60 degrees C. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour while being stirred followed by stirring at 70 degrees C. for 12 hours. Subsequent to cooling down to room temperature, the solvent was distilled away. The resultant was refined by silica gel column chromatography with a solvent mixture of a methylene chloride and methanol with a volume ratio of 99:1 serving as an eluent to obtain 57.0 g of the compound represented by the Chemical formula 4-1.

Chemical formula 4-1

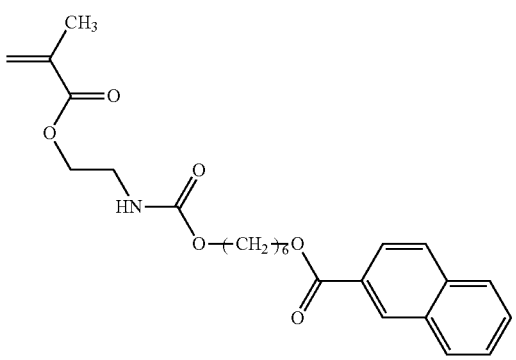

Figure 2:
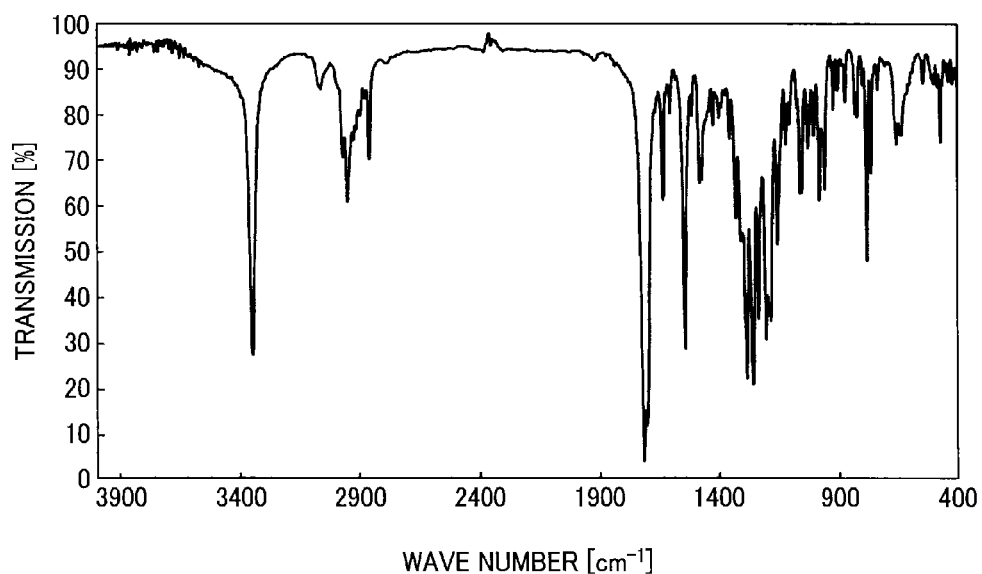
FIG. 2 is a graph illustrating an IR spectrum of the compound represented by Chemical formula 4-1.

FIG. 2 is a graph illustrating an IR spectrum of the compound represented by the Chemical formula 4-1.

Synthesis of Compound Represented by Chemical Formula 4-2

A compound represented by the Chemical formula 4-2 was obtained in the same manner as the compound represented by the Chemical formula 4-1 except that 525 mmol of ethylene glycol (manufactured by TOKYO CHEMICAL INDUSTRY CO., LTD.) was used instead of 525 mmol of 1,6-hexanediol.

Chemical formula 4-2

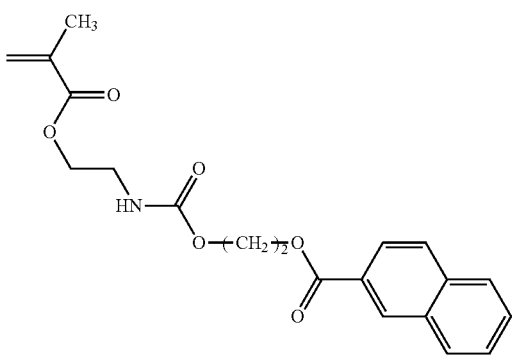

Synthesis of Compound Represented by Chemical Formula 4-3

The compound represented by the Chemical formula 4-3 was obtained in the same manner as the compound represented by the Chemical formula 4-1 except that 525 mmol of 1,12-dodecane diol (manufactured by TOKYO CHEMICAL INDUSTRY CO., LTD.) was used instead of 525 mmol of 1,6-hexanediol.

Chemical formula 4-3

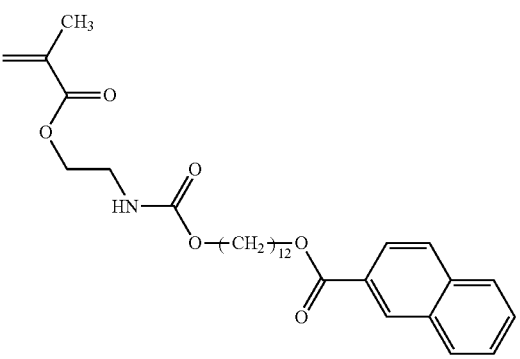

Synthesis of Compound Represented by Chemical Formula 4-4

The compound represented by the Chemical formula 4-4 was obtained in the same manner as the compound represented by the Chemical formula 4-1 except that 525 mmol of 1,16-hexadecane diol (manufactured by TOKYO CHEMICAL INDUSTRY CO., LTD.) was used instead of 525 mmol of 1,6-hexanediol.

Chemical formula 4-4

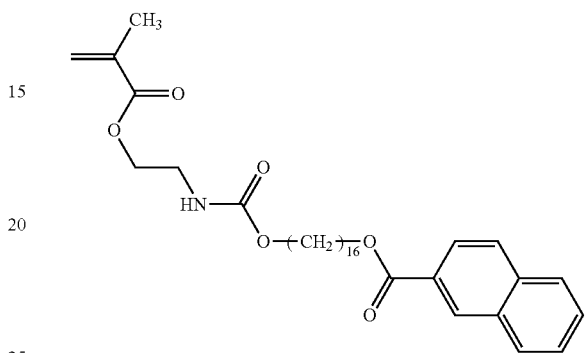

Synthesis of Copolymer 1-1

2.22 g (purity: 89.2 percent, 9.42 mmol) of Phosmer™ M (manufactured by Uni-Chemical Co., Ltd.) and 4.02 g (9.40 mmol) of the compound represented by the Chemical formula 4-1 were dissolved in 30 g of dried 1-methoxy-2-propanol to obtain a monomer solution. Next, all the amount of the monomer solution was divided into 10 percent by mass of the solution and 90 percent by mass of the solution. The 10 percent by mass solution was heated to 90 degrees C. in an argon atmosphere to obtain a solution A, which was charged in a flask. 0.240 g (1.46 mmol) of 2,2'-azoisobutylonitrile (manufactured by Tokyo Chemical Industry Co., Ltd.) was dissolved in the 90 percent by mass to obtain a solution B. The solution B was dripped to the solution A in the flask in 1.5 hours to synthesize a copolymer while being stirred. Furthermore, subsequent to four-hour stirring at 75 degrees C., the resultant was cooled down to room temperature. Next, the resultant was put in hexane followed by filtration.

In addition, the filtered matter was dissolved in tetrahydrofuran followed by drying with a reduced pressure to obtain 6.12 g of a precursor of the copolymer 1-1.

Figure 3:
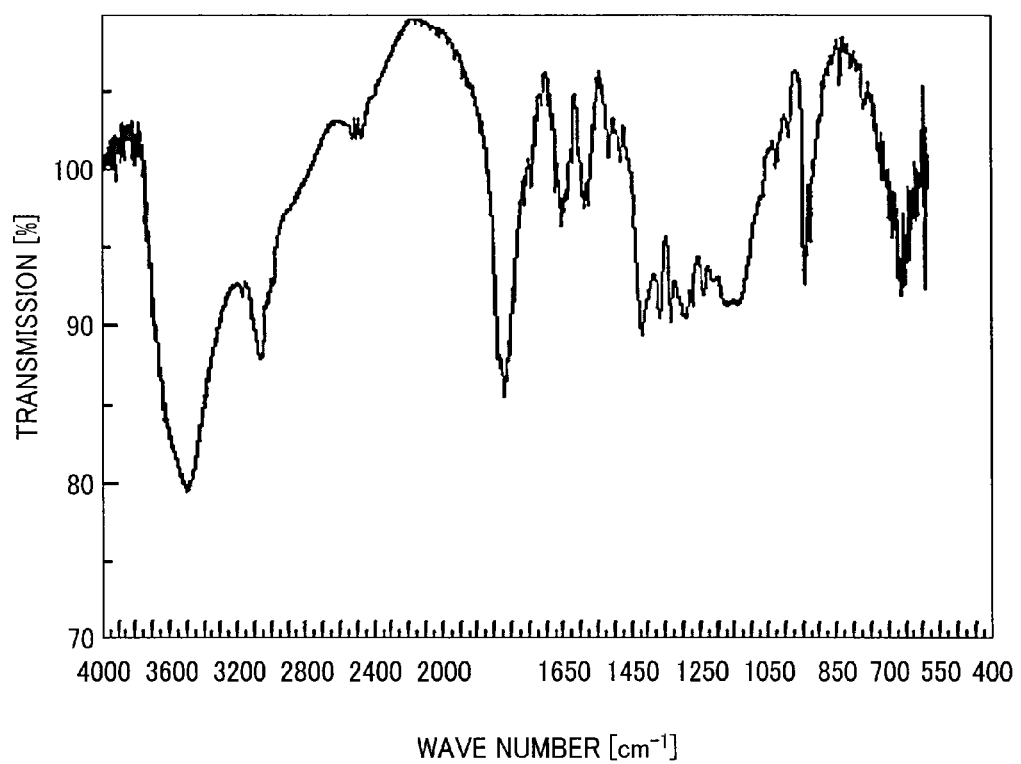
FIG. 3 is a graph illustrating an IR spectrum of a precursor of a copolymer 1-1 described later.

FIG. 3 is a graph illustrating an IR spectrum of the precursor of the copolymer 1-1.

5.00 g of the obtained precursor of the copolymer 1-1 was dissolved in an aqueous solution of tetraethyl ammonium hydroxide in such a manner that the concentration of the copolymer 1-1 was 10 percent by mass and the pH thereof was 8.0 to prepare a 10 percent by mass aqueous solution of the copolymer 1-1. The 10 percent by mass aqueous solution of the copolymer 1-1 had a viscosity of 2.0 mPa·s.

Viscosity of 10 Percent by Mass Aqueous Solution of Copolymer

The viscosity of 10% by mass aqueous solution of the copolymers was measured at 25 degrees C. by using a viscometer (TV-22 type, Cone plate type, manufactured by TOKI SANGYO CO., LTD.). To be specific, 1.1 mL of the 10 percent by mass aqueous solution of copolymer was placed in the sample cup of the viscometer. The cup was mounted onto the viscometer and thereafter left still for one minute. Thereafter, the viscosity value was read one minute after the rotor of the viscometer was rotated.

Synthesis of Copolymer 1-2

10 percent by mass aqueous solution of the copolymer 1-2 was obtained in the same manner as the copolymer 1-1 except that 9.40 mmol of the compound represented by the Chemical formula 4-2 was used instead of 9.40 mmol of the compound represented by the Chemical formula 4-1. The 10 percent by mass aqueous solution of the copolymer 1-2 had a viscosity of 1.8 mPa·s.

Synthesis of Copolymer 1-3

10 percent by mass aqueous solution of the copolymer 1-3 was obtained in the same manner as the copolymer 1-1 except that 9.40 mmol of the compound represented by the Chemical formula 4-3 was used instead of 9.40 mmol of the compound represented by the Chemical formula 4-1. The 10 percent by mass aqueous solution of the copolymer 1-3 had a viscosity of 1.7 mPa·s.

Synthesis of Copolymer 1-4

10 percent by mass aqueous solution of the copolymer 1-4 was obtained in the same manner as the copolymer 1-1 except that 9.40 mmol of the compound represented by the Chemical formula 4-4 was used instead of 9.40 mmol of the compound represented by the Chemical formula 4-1. The 10 percent by mass aqueous solution of the copolymer 1-4 had a viscosity of 2.1 mPa·s.

Synthesis of Copolymer 1-5

10 percent by mass aqueous solution of the copolymer 1-5 was obtained in the same manner as the copolymer 1-1 except that 9.42 mmol of LIGHT ACRYLATE P-1A (manufactured by Kyoeisha Chemical Co., Ltd.) was used instead of 9.42 mmol of Phosmer™ M (manufactured by Uni-Chemical Co., Ltd.). The 10 percent by mass aqueous solution of the copolymer 1-5 had a viscosity of 1.9 mPa·s.

Synthesis of Copolymer 1-6

10 percent by mass aqueous solution of the copolymer 1-6 was obtained in the same manner as the copolymer 1-1 except that 9.42 mmol of Phosmer™ PE (manufactured by Uni-Chemical Co., Ltd.) was used instead of 9.42 mmol of Phosmer™ M (manufactured by Uni-Chemical Co., Ltd.). The 10 percent by mass aqueous solution of the copolymer 1-6 had a viscosity of 2.0 mPa·s.

Synthesis of Copolymer 1-7

10 percent by mass aqueous solution of the copolymer 1-7 was obtained in the same manner as the copolymer 1-1 except that 9.42 mmol of Phosmer™ PP (manufactured by Uni-Chemical Co., Ltd.) was used instead of 9.42 mmol of Phosmer™ M (manufactured by Uni-Chemical Co., Ltd.). The 10 percent by mass aqueous solution of the copolymer 1-7 had a viscosity of 1.8 mPa·s.

Synthesis of Copolymer 1-8

10 percent by mass aqueous solution of the copolymer 1-8 was obtained in the same manner as the copolymer 1-1 except that 9.42 mmol of acid phophoxypoly(oxyethylene oxypropylene)glycol methacrylate was used instead of 9.42 mmol of Phosmer™ M (manufactured by Uni-Chemical Co., Ltd.). The 10 percent by mass aqueous solution of the copolymer 1-8 had a viscosity of 2.2 mPa·s.

Synthesis of Copolymer 1-9

10 percent by mass aqueous solution of the copolymer 1-9 was obtained in the same manner as the copolymer 1-1 except that the amount of Phosmer™ M (manufactured by Uni-Chemical Co., Ltd.) was changed to 4.71 mmol. The 10 percent by mass aqueous solution of the copolymer 1-9 had a viscosity of 2.6 mPa·s.

Synthesis of Copolymer 1-10

10 percent by mass aqueous solution of the copolymer 1-10 was obtained in the same manner as the copolymer 1-1 except that the amount of Phosmer™ M (manufactured by Uni-Chemical Co., Ltd.) was changed to 28.26 mmol. The 10 percent by mass aqueous solution of the copolymer 1-10 had a viscosity of 1.6 mPa·s.

Figure 4:
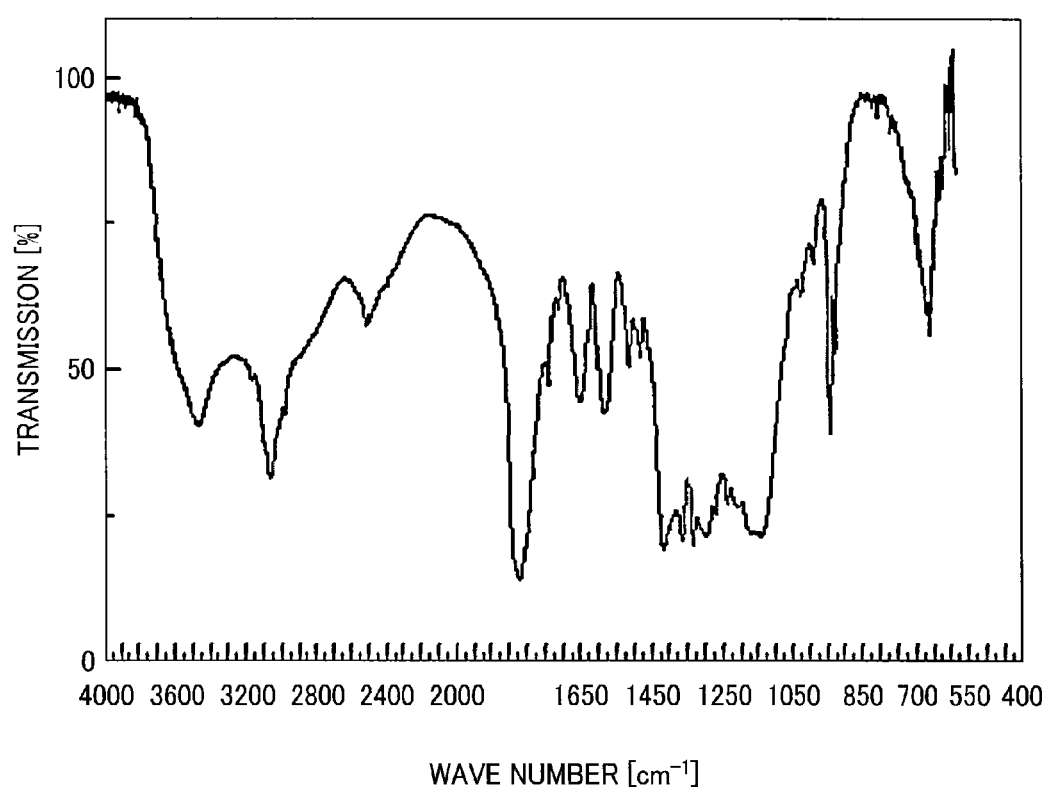
FIG. 4 is a graph illustrating an IR spectrum of a precursor of a copolymer 1-10 described later.

FIG. 4 is a graph illustrating an IR spectrum of the precursor of the copolymer 1-10.

Synthesis of Copolymer 1-11

10 percent by mass aqueous solution of the copolymer 1-11 was obtained in the same manner as the copolymer 1-1 except that the amount of Phosmer™ M (manufactured by Uni-Chemical Co., Ltd.) was changed to 37.68 mmol. The 10 percent by mass aqueous solution of the copolymer 1-11 had a viscosity of 1.5 mPa·s.

Synthesis of Copolymer 1-12

10 percent by mass aqueous solution of the copolymer 1-12 was obtained in the same manner as the copolymer 1-1 except that an aqueous solution of sodium hydroxide was used instead of the aqueous solution of tetraethyl ammonium hydroxide. The 10 percent by mass aqueous solution of the copolymer 1-12 had a viscosity of 1.4 mPa·s.

Synthesis of Copolymer 1-13

10 percent by mass aqueous solution of the copolymer 1-13 was obtained in the same manner as the copolymer 1-1 except that 94.2 mmol of LIGHT ACRYLATE P-1A (manufactured by Kyoeisha Chemical Co., Ltd.) and an aqueous solution of sodium hydroxide were respectively used instead of 9.42 mmol of Phosmer™ M (manufactured by Uni-Chemical Co., Ltd.) and an aqueous solution of tetraethyl ammonium hydroxide. The 10 percent by mass aqueous solution of the copolymer 1-13 had a viscosity of 17.8 mPa·s.

Synthesis of Copolymer 1-14

59.8 g (140 mmol) of the compound represented by the Chemical formula 4-1 was dissolved in 6.60 g (purity 89.2 percent, 28.0 mmol) of Phosmer™ M (manufactured by Uni-Chemical Co., Ltd.). Next, 100 g of deionized water, 3.0 g of radical polimerizable anionic surfactant (Aqualon KH-10, manufactured by DKS Co. Ltd.), and 1.0 g of ammonium persulfate were added to the solution followed by dispersion by a HOMO MIXER to obtain a pre-emulsion. Thereafter, 2.0 g of Aqualon KH-10 (manufactured by DKS Co. Ltd.) was added to 100 g of deionized water, which was thereafter heated to 80 degrees C. in argon atmosphere. Thereafter, 10 percent by mass of the pre-emulsion was added to conduct polymerization for 30 minutes. Next, 90 percent by mass of the pre-emulsion was dripped to the resultant in two hours while being stirred followed by polymerization for two hours at 80 degrees C. Subsequent to cooling down to room temperature, the resultant was distilled away. Next, the filtered matter was neutralized with an aqueous solution of tetraethyl ammonium hydroxide to obtain 30 percent by mass aqueous solution of the copolymer 1-14. The 30 percent by mass aqueous solution of the copolymer 1-14 was diluted with water. The 10 percent by mass aqueous solution of the copolymer 1-14 had a viscosity of 28.5 mPa·s.

Synthesis of Copolymer 1-15

64.1 g (150 mmol) of the compound represented by the Chemical formula 4-1 was dissolved in 11.76 g (60.0 mmol) of LIGHT ACRYLATE P-1A (manufactured by Kyoeisha Chemical Co., Ltd.). Next, 130 g of deionized water, 4.0 g of radical polimerizable anionic surfactant (Aqualon KH-10, manufactured by DKS Co. Ltd.), and 1.3 g of ammonium persulfate were added to the solution followed by dispersion by a HOMO MIXER to obtain a pre-emulsion. 30 percent by mass aqueous solution of Copolymer 1-15 was obtained in the same manner as the copolymer 1-14 except that the thus-obtained pre-emulsion was used. The 30 percent by mass aqueous solution of the copolymer 1-15 was diluted with water. The 10 percent by mass aqueous solution of the copolymer 1-15 had a viscosity of 29.4 mPa·s.

In Table 1, the ingredients of the copolymers 1-1 to 1-15 are shown.

TABLE 1

| Copol-ymer 1 | Molar ratio | | | | $M_1^+ \cdot M_2^+$ |
|---|---|---|---|---|---|
| | Chemical formula 1 | Chemical formula 2 | Chemical formula 3 | Chemical formula 4 | |
| 1-1 | 1 | 1 | Chemical formula 3-1 | Chemical formula 4-1 | TEA |
| 1-2 | 1 | 1 | Chemical formula 3-1 | Chemical formula 4-2 | TEA |
| 1-3 | 1 | 1 | Chemical formula 3-1 | Chemical formula 4-3 | TEA |
| 1-4 | 1 | 1 | Chemical formula 3-1 | Chemical formula 4-4 | TEA |
| 1-5 | 1 | 1 | Chemical formula 3-2 | Chemical formula 4-1 | TEA |
| 1-6 | 1 | 1 | Chemical formula 3-3 | Chemical formula 4-1 | TEA |
| 1-7 | 1 | 1 | Chemical formula 3-4 | Chemical formula 4-1 | TEA |
| 1-8 | 1 | 1 | Chemical formula 3-5 | Chemical formula 4-1 | TEA |
| 1-9 | 0.5 | 1 | Chemical formula 3-1 | Chemical formula 4-1 | TEA |
| 1-10 | 3 | 1 | Chemical formula 3-1 | Chemical formula 4-1 | TEA |
| 1-11 | 4 | 1 | Chemical formula 3-1 | Chemical formula 4-1 | TEA |
| 1-12 | 1 | 1 | Chemical formula 3-1 | Chemical formula 4-1 | Na$^+$ |
| 1-13 | 10 | 1 | Chemical formula 3-2 | Chemical formula 4-4 | Na$^+$ |
| 1-14 | 0.2 | 1 | Chemical formula 3-1 | Chemical formula 4-1 | TEA |
| 1-15 | 0.4 | 1 | Chemical formula 3-2 | Chemical formula 4-1 | TEA |

TEA represents tetraethylammonium ion.

Preparation of Pigment Dispersion 1-1

16.0 parts of carbon black (NIPEX 150, manufactured by Degussa AG) and 44.0 parts of deionized water were added to 40.0 parts of the 10 percent by mass aqueous solution of the copolymer 1-1 followed by stirring for 12 hours. Next, using a disk type bead mill (KDL type, manufactured by Shinmaru Enterprises Corporation), the resultant was subject to circulation dispersion at a peripheral speed of 10 m/s for one hour. The used media were zirconia balls having a diameter of 0.1 mm. Furthermore, subsequent to filtration by a membrane filter having an opening diameter of 1.2 μm, deionized water was added in such a manner that the concentration of the pigment was 16 percent by mass to obtain a pigment dispersion 1-1.

Preparation of Pigment Dispersions 1-2 to 1-13

Pigment dispersions 1-2 to 1-13 were obtained in the same manner as in the pigment dispersion 1-1 except that each of 10 percent by mass aqueous solutions of the copolymers 1-2 to 1-13 was used instead of 10 percent by mass aqueous solution the copolymer 1-1.

Preparation of Pigment Dispersion 1-14

The pigment dispersion 1-14 was obtained in the same manner as the pigment dispersion 1-1 except that 20.0 parts of cyan pigment (CHROMOFINR BLUE, Pigment blue 15:3, manufactured by Dainichiseika Color & Chemicals Mfg. Co., Ltd.) and 40.0 parts of deionized water were used instead of 16.0 parts of carbon black (NIPEX 1500, manufactured by Degussa AG) and 44.0 parts of deionized water) and the concentration of the pigment was 20 percent by mass.

Preparation of Pigment Dispersion 1-15

The pigment dispersion 1-15 was obtained in the same manner as the pigment dispersion 1-1 except that 20.0 parts of magenta pigment (TONER MAGENTA E0002, Pigment red 122, manufactured by Clariant K.K.) was used instead of 16.0 parts of carbon black (NIPEX 1500, manufactured by Degussa AG) and 44.0 parts of deionized water) and the concentration of the pigment was 20 percent by mass.

Preparation of Pigment Dispersion 1-16

The pigment dispersion 1-16 was obtained in the same manner as the pigment dispersion 1-1 except that 20.0 parts of yellow pigment (FAST YELLOW, Pigment yellow 531, manufactured by Dainichiseika Color & Chemicals Mfg. Co., Ltd.) was used instead of 16.0 parts of carbon black (NIPEX 1500, manufactured by Degussa AG) and 44.0 parts of deionized water) and the concentration of the pigment was 20 percent by mass.

Preparation of Pigment Dispersion 1-17

50 g of dried carbon black, 100 mL of deionized water, and 15.5 g (50 mmol) of the compound represented by the following Chemical formula 1 were mixed. The mixture was heated to 60 degrees C. while being stirred at 300 rpm.

Chemical formula I

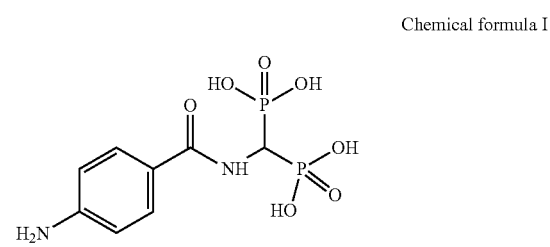 [SMILES: Nc1ccc(C(=O)NC(P(=O)(O)O)P(=O)(O)O)cc1]

Thereafter, 50 mmol of 20 percent aqueous solution of sodium nitrite was added in 15 minutes. Thereafter, the resultant was stirred at 60 degrees C. for three hours. Furthermore, subsequent to dilution with 75 mL of deionized water, the resultant was filtrated. Furthermore, deionized water was added in such a manner that the concentration of the pigment was 20 percent by mass to obtain a pigment dispersion 1-17 having a treated surface.

Preparation of Pigment Dispersion 1-18

Thereafter, 4.50 g of p-amino benzoate was added to 150 g of deionized water heated to 60 degrees C. followed by mixing at 8,000 rpm for 10 minutes.

Next, after a solution in which 1.8 g of sodium nitrite was dissolved in 15.0 g of deionized water and 20.0 g of copper phthalocyanine pigment (Pigment Blue 15:4, manufactured by Sun Chemical Corporation) were sequentially added to the mixture followed by mixing at 8,500 rpm for one hour. Furthermore, a solution in which 4.5 g of p-amino benzoic acid was dissolved in 15.0 g of deionized water was added to the mixture followed by mixing at 65 degrees C. at 8,500 rpm for three hours. The thus-obtained mixture was filtered by a mesh of 200 nm. Subsequent to rinsing with water, the resultant was dispersed in water. Coarse particles were removed by centrifugal and deionized water was added in such a manner that the concentration of the pigment was 20.0 percent by mass to obtain a pigment dispersion 1-18 having a surface treated with p-amino benzoic acid.

Preparation of Pigment Dispersion 1-19

The pigment dispersion 1-19 having a surface treated with sulfanilic acid was obtained in the same manner as the pigment dispersion 1-18 except that sulfanilic acid and a magenta pigment (Pigment red 122, manufactured by Sun Chemical) were used instead of p-amino benzoic acid and copper phthalocyanine pigment (Pigment blue 15:4, manufactured by Sun Chemical).

The ingredients of the pigment dispersions are shown in Table 2.

TABLE 2

| Pigment dispersion 1 | Copolymer 1 | Pigment | Storage stability |
|---|---|---|---|
| 1-1 | 1-1 | Black | A |
| 1-2 | 1-2 | Black | A |
| 1-3 | 1-3 | Black | B |
| 1-4 | 1-4 | Black | B |
| 1-5 | 1-5 | Black | A |
| 1-6 | 1-6 | Black | A |
| 1-7 | 1-7 | Black | A |
| 1-8 | 1-8 | Black | A |
| 1-9 | 1-9 | Black | A |
| 1-10 | 1-10 | Black | A |
| 1-11 | 1-11 | Black | B |
| 1-12 | 1-12 | Black | B |
| 1-13 | 1-13 | Black | B |
| 1-14 | 1-1 | Cyan | A |
| 1-15 | 1-1 | Magenta | A |
| 1-16 | 1-1 | Yellow | A |
| 1-17 | — | Black | — |
| 1-18 | — | Cyan | — |
| 1-19 | — | Magenta | — |

Storage stability of the pigment dispersions was evaluated.

Storage Stability of Pigment Dispersion

A glass container was filled with the pigment dispersion and stored at 70 degrees C. for two weeks. The viscosity change rate was obtained from the following relation: |(Viscosity of pigment dispersion after storage)−(Viscosity of pigment dispersion before storage)|/(Viscosity of pigment dispersion before storage)×100, to evaluate the storage stability. The viscosity of the pigment dispersion at 25 degrees C. was measured at 50 rpm by using a viscometer (RE80L, manufactured by TOKI SANGYO CO., LTD.). The change rate of the viscosity was rated as follows:
A: Less than 5%
B 5% to less than 8%
C: 8% to less than 10%
D: 10% to less than 30%
E: 30% or greater As seen in Table 2, it is confirmed that the pigment dispersions 1-1 to 1-16 have excellent storage stability.

Example 1-1

45.0 parts of pigment dispersion 1-1, 10.0 parts of 1,3-butanediol, 10.0 parts of glycerin, 10.0 parts of 3-methoxy-N,N-diemthyl propionamide, 1.0 part of fluorine-containing surfactant (ZONYL™ FS-300, solid portion: 40 percent by mass, manufactured by E. I. du Pont de Nemours and Company), and 24.0 parts of deionized water were mixed followed by stirring for one hour and filtration by a membrane filter having an opening diameter of 1.2 micro meter to obtain an ink.

Examples 1-2 to 1-13

Inks were obtained in the same manner as in Example 1-1 except that each of the pigment dispersions 1-2 to 1-13 was used instead of the pigment dispersion 1-1.

Example 1-14

Ink was obtained in the same manner as in Example 1-1 except that 30.0 parts of the pigment dispersion 1-14 was used instead of 45.0 parts of the pigment dispersion 1-1 and the contents of 1,3-butanediol and 3-methoxy-N,N-dimethyl propionamide were respectively changed to 15.0 parts and 20.0 parts.

Example 1-15

Ink was obtained in the same manner as in Example 1-1 except that 30.0 parts of the pigment dispersion 1-15 was used instead of 45.0 parts of the pigment dispersion 1-1 and the contents of deionized water was changed to 9.0 parts.

Example 1-16

Ink was obtained in the same manner as in Example 1-15 except that the pigment dispersion 1-16 was used instead of the pigment dispersion 1-15.

Preparation of Medium Dispersion A 2.0 parts of 2-ethyl-1,3-hexanediol, 10.0 parts of glycerol, 15.0 parts of 3-methoxy-N,N-dimethyl propaneamide, 15.0 parts of 3-buthoxy-N,N-dimethyl propaneamide, 0.05 parts of 2-(cyclohexylamino)ethane sulfonic acid, 0.5 parts of 2,4,7,9-tetramethyl-4,7-decane diol, 0.25 parts of ZONYL FS-300 (manufactured by E. I. du Pont de Nemours and Company), 0.01 parts of diethanolamine, and 12.93 parts of deionized water were mixed followed by stirring for 30 minutes to obtain a medium dispersion A.

Example 1-17

37.5 parts of the pigment dispersion 1-17 was added to the medium dispersion A followed by stirring for 30 minutes. Thereafter, 6.67 parts of 30 percent by mass aqueous solution of the copolymer 1-14 was added followed by stirring for 30 minutes. Furthermore, ink was obtained by filtering the resultant with a membrane filter having an opening diameter of 1.2 µm.

Preparation of Medium Dispersion B

The medium dispersion B was obtained in the same manner as the medium dispersion A except that the contents of 3-methoxy-N,N-dimetheyl propaneamide, 3-buthoxy-N,N-dimetheyl propaneamide, and deionized water were respectively changed to 20.0 parts, 20.0 parts, and 17.93 parts.

Example 1-18

22.5 parts of the pigment dispersion 1-18 was added to the medium dispersion B followed by stirring for 30 minutes. Thereafter, 6.67 parts of 30 percent by mass aqueous solution of the copolymer 1-15 was added followed by stirring for 30 minutes. Furthermore, ink was obtained by filtering the resultant with a membrane filter having an opening diameter of 1.2 µm.

Example 1-19

Ink was obtained in the same manner as in Example 1-17 except that the pigment dispersion 1-19 and 30 percent by mass aqueous solution of the copolymer 1-15 were used instead of the pigment dispersion 1-17 and 30 percent by mass aqueous solution of the copolymer 1-14.

Example 1-20

Ink was obtained in the same manner as in Example 1-18 except that the pigment dispersion 1-14 was used instead of the pigment dispersion 1-18.

The ingredients of Examples 1-1 to 1-20 are shown in Table 3.

TABLE 3

| Example 1 | Pigment Dispersion 1 | Copolymer 1 |
|---|---|---|
| 1-1 | 1-1 | — |
| 1-2 | 1-2 | — |
| 1-3 | 1-3 | — |
| 1-4 | 1-4 | — |
| 1-5 | 1-5 | — |
| 1-6 | 1-6 | — |
| 1-7 | 1-7 | — |
| 1-8 | 1-8 | — |
| 1-9 | 1-9 | — |
| 1-10 | 1-10 | — |
| 1-11 | 1-11 | — |
| 1-12 | 1-12 | — |
| 1-13 | 1-13 | — |
| 1-14 | 1-14 | — |
| 1-15 | 1-15 | — |
| 1-16 | 1-16 | — |
| 1-17 | 1-17 | 1-14 |
| 1-18 | 1-18 | 1-15 |
| 1-19 | 1-19 | 1-15 |
| 1-20 | 1-14 | 1-15 |

Synthesis of Copolymer 2-1

2.01 g (purity: 89.2 percent, 8.51 mmol) of Phosmer™ M (manufactured by Uni-Chemical Co., Ltd.), 0.58 g (3.40 mmol) of diacetone acrylamide (manufactured by TOKYO CHEMICAL INDUSTRY CO., LTD.), and 3.64 g (8.51 mmol) of the compound represented by the Chemical formula 4-1 were dissolved in 30 g of dried 1-methoxy-2-propanol to obtain a monomer solution. Next, all the amount of the monomer solution was divided into 10 percent by mass of the solution and 90 percent by mass of the solution. The 10 percent by mass solution was heated to 90 degrees C. in an argon atmosphere to obtain a solution A, which was charged in a flask. 0.240 g (1.46 mmol) of 2,2'-azoisobutylonitrile (manufactured by Tokyo Chemical Industry Co., Ltd.) was dissolved in the 90 percent by mass to obtain a solution B. The solution B was dripped to the solution A in the flask in 1.5 hours to synthesize a copolymer while being stirred. Furthermore, subsequent to four-hour stirring at 75 degrees C., the resultant was cooled down to room temperature. Next, the resultant was put in hexane followed by filtration.

In addition, the filtered matter was dissolved in tetrahydrofuran followed by drying with a reduced pressure to obtain 6.10 g of a precursor of the copolymer 2-1.

Figure 5:
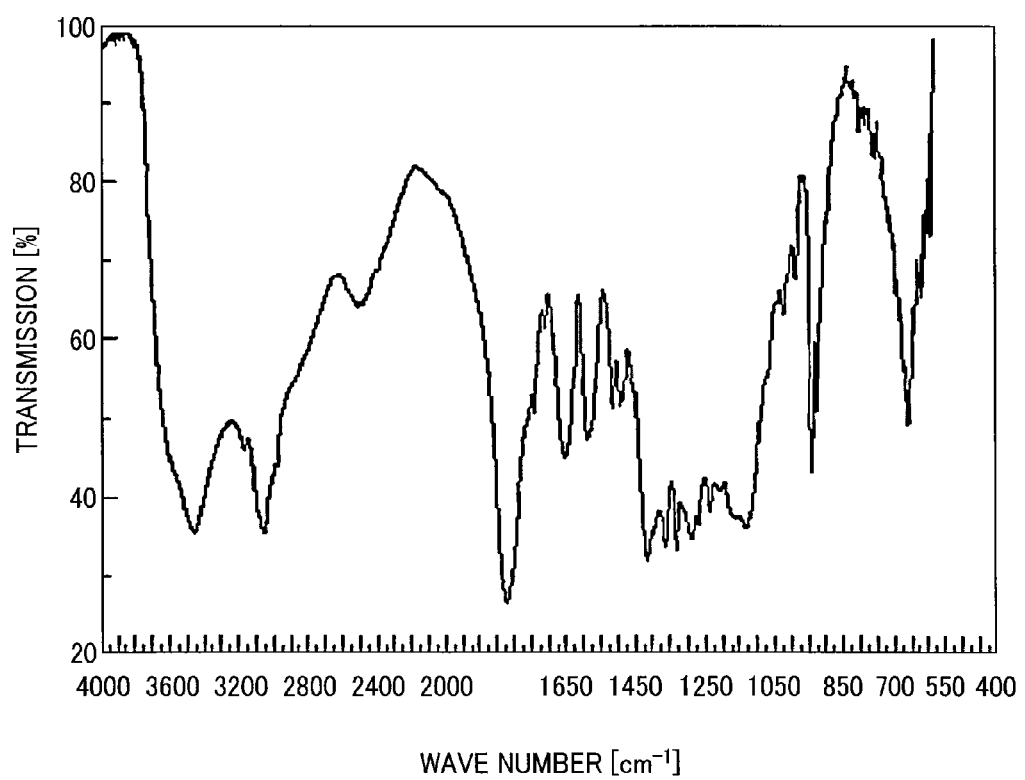
FIG. 5 is a graph illustrating an IR spectrum of a precursor of a copolymer 2-1 described later.

FIG. 5 is a graph illustrating an IR spectrum of the precursor of the copolymer 2-1.

5.00 g of the obtained precursor of the copolymer 2-1 was dissolved in an aqueous solution of tetraethyl ammonium hydroxide in such a manner that the concentration of the copolymer 2-1 was 10 percent by mass and the pH thereof was 8.0 to prepare a 10 percent by mass aqueous solution of the copolymer 2-1. The 10 percent by mass aqueous solution of the copolymer 2-1 had a viscosity of 2.2 mPa·s.

Synthesis of Copolymer 2-2

10 percent by mass aqueous solution of the copolymer 2-2 was obtained in the same manner as the copolymer 2-1 except that 8.51 mmol of the compound represented by the Chemical formula 4-2 was used instead of 8.51 mmol of the compound represented by the Chemical formula 4-1. The 10 percent by mass aqueous solution of the copolymer 2-2 had a viscosity of 1.9 mPa·s.

Synthesis of Copolymer 2-3

10 percent by mass aqueous solution of the copolymer 2-3 was obtained in the same manner as the copolymer 2-1 except that 8.51 mmol of the compound represented by the Chemical formula 4-3 was used instead of 8.51 mmol of the compound represented by the Chemical formula 4-1. The 10 percent by mass aqueous solution of the copolymer 2-3 had a viscosity of 2.1 mPa·s.

Synthesis of Copolymer 2-4

10 percent by mass aqueous solution of the copolymer 2-4 was obtained in the same manner as the copolymer 2-1 except that 8.51 mmol of the compound represented by the Chemical formula 4-4 was used instead of 8.51 mmol of the compound represented by the Chemical formula 4-1. The 10 percent by mass aqueous solution of the copolymer 2-4 had a viscosity of 2.0 mPa·s.

Synthesis of Copolymer 2-5

10 percent by mass aqueous solution of the copolymer 2-5 was obtained in the same manner as the copolymer 2-1 except that 8.51 mmol of LIGHT ACRYLATE P-1A (manufactured by Kyoeisha Chemical Co., Ltd.) was used instead of 8.51 mmol of Phosmer™ M (manufactured by Uni-Chemical Co., Ltd.). The 10 percent by mass aqueous solution of the copolymer 2-5 had a viscosity of 1.9 mPa·s.

Synthesis of Copolymer 2-6

10 percent by mass aqueous solution of the copolymer 2-6 was obtained in the same manner as the copolymer 2-1 except that 8.51 mmol of Phosmer™ PE (manufactured by Uni-Chemical Co., Ltd.) was used instead of 8.51 mmol of Phosmer™ M (manufactured by Uni-Chemical Co., Ltd.). The 10 percent by mass aqueous solution of the copolymer 2-6 had a viscosity of 2.1 mPa·s.

Synthesis of Copolymer 2-7

10 percent by mass aqueous solution of the copolymer 2-7 was obtained in the same manner as the copolymer 2-1 except that 8.51 mmol of Phosmer™ PP (manufactured by Uni-Chemical Co., Ltd.) was used instead of 8.51 mmol of Phosmer™ M (manufactured by Uni-Chemical Co., Ltd.). The 10 percent by mass aqueous solution of the copolymer 2-7 had a viscosity of 1.6 mPa·s.

Synthesis of Copolymer 2-8

10 percent by mass aqueous solution of the copolymer 2-8 was obtained in the same manner as the copolymer 2-1 except that 8.51 mmol of acid phophoxypoly(oxyethylene oxypropylene)glycol methacrylate was used instead of 8.51 mmol of Phosmer™ M (manufactured by Uni-Chemical Co., Ltd.). The 10 percent by mass aqueous solution of the copolymer 2-8 had a viscosity of 2.4 mPa·s.

Synthesis of Copolymer 2-9

10 percent by mass aqueous solution of the copolymer 2-9 was obtained in the same manner as the copolymer 2-1 except that 3.40 mmol of diacetone methacrylamide (manufactured by TOKYO CHEMICAL INDUSTRY CO., LTD.) was used instead of 3.40 mmol of diacetone acrylamide (manufactured by TOKYO CHEMICAL INDUSTRY CO., LTD.) The 10 percent by mass aqueous solution of the copolymer 2-9 had a viscosity of 2.1 mPa·s.

Synthesis of Copolymer 2-10

10 percent by mass aqueous solution of the copolymer 2-10 was obtained in the same manner as the copolymer 2-1 except that the amount of Phosmer™ M (manufactured by Uni-Chemical Co., Ltd.) was changed to 5.11 mmol. The 10 percent by mass aqueous solution of the copolymer 2-10 had a viscosity of 1.7 mPa·s.

Figure 6:
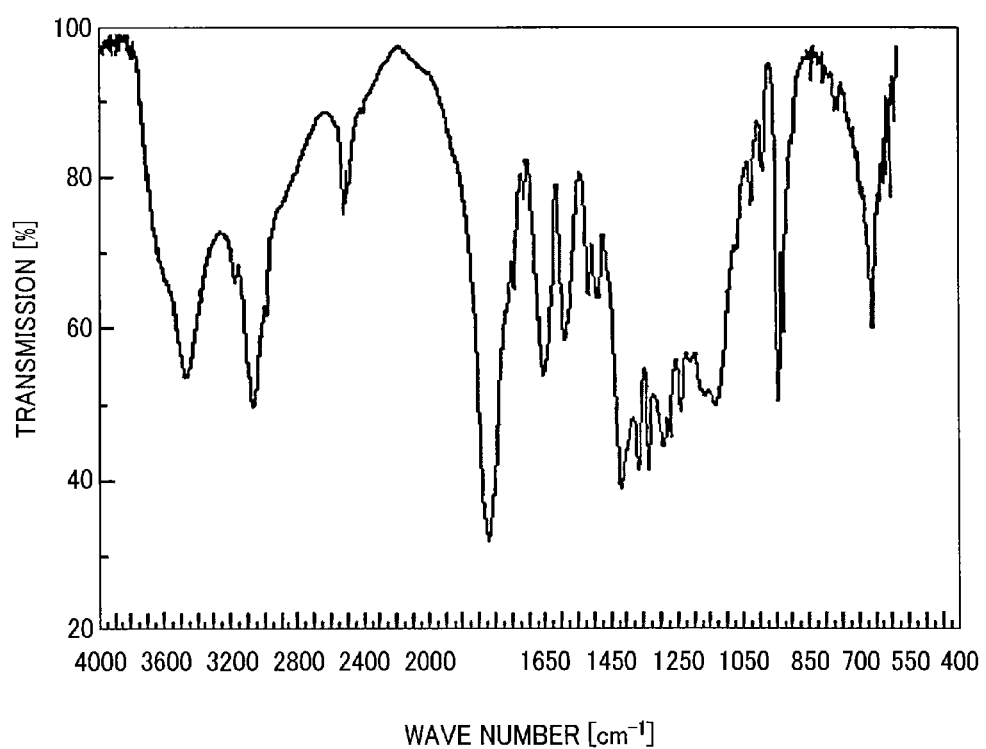
FIG. 6 is a graph illustrating an IR spectrum of a precursor of a copolymer 2-10 described later.

FIG. 6 is a graph illustrating an IR spectrum of the precursor of the copolymer 2-10.

Synthesis of Copolymer 2-11

10 percent by mass aqueous solution of the copolymer 2-11 was obtained in the same manner as the copolymer 2-1 except that the amount of Phosmer™ M (manufactured by Uni- Chemical Co., Ltd.) and the amount of diacetone acrylamide (manufactured by TOKYO CHEMICAL INDUSTRY CO., LTD.) were respectively changed to 51.1 mmol and 34.0 mmol. The 10 percent by mass aqueous solution of the copolymer 2-11 had a viscosity of 1.4 mPa·s.

Synthesis of Copolymer 2-12

10 percent by mass aqueous solution of the copolymer 2-12 was obtained in the same manner as the copolymer 2-1 except that the amount of Phosmer™ M (manufactured by Uni-Chemical Co., Ltd.) and the amount of diacetone acrylamide (manufactured by TOKYO CHEMICAL INDUSTRY CO., LTD.) were respectively changed to 2.55 mmol and 0.85 mmol. The 10 percent by mass aqueous solution of the copolymer 2-12 had a viscosity of 1.6 mPa·s.

Synthesis of Copolymer 2-13

10 percent by mass aqueous solution of the copolymer 2-13 was obtained in the same manner as the copolymer 2-1 except that the amount of Phosmer™ M (manufactured by Uni-Chemical Co., Ltd.) and th amount of diacetone acrylamide (manufactured by TOKYO CHEMICAL INDUSTRY CO., LTD.) were respectively changed to 68.1 mmol and 51.0 mmol. The 10 percent by mass aqueous solution of the copolymer 2-13 had a viscosity of 2.5 mPa·s.

Synthesis of Copolymer 2-14

10 percent by mass aqueous solution of the copolymer 2-14 was obtained in the same manner as the copolymer 2-1 except that the amount of Phosmer™ M (manufactured by Uni-Chemical Co., Ltd.) and the amount of diacetone acrylamide (manufactured by TOKYO CHEMICAL INDUSTRY CO., LTD.) were respectively changed to 76.6 mmol and 0.85 mmol. The 10 percent by mass aqueous solution of the copolymer 2-14 had a viscosity of 1.9 mPa·s.

Synthesis of Copolymer 2-15

10 percent by mass aqueous solution of the copolymer 2-15 was obtained in the same manner as the copolymer 2-1 except that an aqueous solution of sodium hydroxide was used instead of the aqueous solution of tetraethyl ammonium hydroxide. The 10 percent by mass aqueous solution of the copolymer 2-15 had a viscosity of 1.5 mPa·s.

Synthesis of Copolymer 2-16

10 percent by mass aqueous solution of the copolymer 2-16 was obtained in the same manner as the copolymer 2-1 except that 8.51 mmol of LIGHT ACRYLATE P-1A (manufactured by Kyoeisha Chemical Co., Ltd.) and an aqueous solution of sodium hydroxide were used instead of 8.51 mmol of Phosmer™ M (manufactured by Uni-Chemical Co., Ltd.) and the aqueous solution of tetraethyl ammonium hydroxide. The 10 percent by mass aqueous solution of the copolymer 2-16 had a viscosity of 19.9 mPa·s.

Synthesis of Copolymer 2-17

55.3 g (129.5 mmol) of the compound represented by the Chemical formula 4-1 and 2.19 g (12.9 mmol) of diacetone acrylamide (manufactured by TOKYO CHEMICAL INDUSTRY CO., LTD.) were dissolved in 9.15 g (purity 89.2 percent, 38.8 mmol) of Phosmer™ M (manufactured by Uni-Chemical Co., Ltd.). Next, 100 g of deionized water, 3.0 g of radical polimerizable anionic surfactant (Aqualon KH-10, manufactured by DKS Co. Ltd.), and 1.0 g of ammonium persulfate were added to the solution followed by dispersion by a HOMO MIXER to obtain a pre-emulsion. 30 percent by mass aqueous solution of Copolymer 2-17 was obtained in the same manner as the copolymer 1-14 except that the thus-obtained pre-emulsion was used. The 30 percent by mass aqueous solution of the copolymer 2-17 was diluted with water. The 10 percent by mass aqueous solution of the copolymer 2-17 had a viscosity of 28.8 mPa·s.

Synthesis of Copolymer 2-18

55.8 g (130.5 mmol) of the compound represented by the Chemical formula 4-1 and 2.21 g (13.1 mmol) of diacetone acrylamide (manufactured by TOKYO CHEMICAL INDUSTRY CO., LTD.) were dissolved in 7.68 g (39.2 mmol) of LIGHT ACRYLATE P-1A (manufactured by Kyoeisha Chemical Co., Ltd.). Next, 100 g of deionized water, 4.0 g of radical polimerizable anionic surfactant (Aqualon KH-10, manufactured by DKS Co. Ltd.), and 1.3 g of ammonium persulfate were added to the solution followed by dispersion by a HOMO MIXER to obtain a pre-emulsion. 30 percent by mass aqueous solution of Copolymer 2-18 was obtained in the same manner as the copolymer 1-14 except that the thus-obtained pre-emulsion was used. The 30 percent by mass aqueous solution of the copolymer 2-18 was diluted with water. The 10 percent by mass aqueous solution of the copolymer 2-18 had a viscosity of 27.5 mPa·s.

In Table 4, the ingredients of the copolymers 2-1 to 2-18 are shown.

TABLE 4

| Co-polymer 2 | Molar ratio | | | | | | $M_1^+$ · $M_2^+$ |
|---|---|---|---|---|---|---|---|
| | Chemical formula 1 | Chemical formula 2 | Chemical formula 5 | Chemical formula 3 | Chemical formula 4 | Chemical formula 6 | |
| 2-1 | 1 | 1 | 0.4 | 3-1 | 4-1 | DAAM | TEA |
| 2-2 | 1 | 1 | 0.4 | 3-1 | 4-2 | DAAM | TEA |
| 2-3 | 1 | 1 | 0.4 | 3-1 | 4-3 | DAAM | TEA |
| 2-4 | 1 | 1 | 0.4 | 3-1 | 4-4 | DAAM | TEA |
| 2-5 | 1 | 1 | 0.4 | 3-2 | 4-1 | DAAM | TEA |
| 2-6 | 1 | 1 | 0.4 | 3-3 | 4-1 | DAAM | TEA |
| 2-7 | 1 | 1 | 0.4 | 3-4 | 4-1 | DAAM | TEA |
| 2-8 | 1 | 1 | 0.4 | 3-5 | 4-1 | DAAM | TEA |
| 2-9 | 1 | 1 | 0.4 | 3-1 | 4-1 | DMAAM | TEA |
| 2-10 | 0.6 | 1 | 0.4 | 3-1 | 4-1 | DAAM | TEA |
| 2-11 | 6 | 1 | 4 | 3-1 | 4-1 | DAAM | TEA |
| 2-12 | 0.3 | 1 | 0.1 | 3-1 | 4-1 | DAAM | TEA |
| 2-13 | 8 | 1 | 6 | 3-1 | 4-4 | DAAM | TEA |
| 2-14 | 9 | 1 | 0.1 | 3-1 | 4-1 | DAAM | TEA |
| 2-15 | 1 | 1 | 0.4 | 3-1 | 4-1 | DAAM | Na$^+$ |
| 2-16 | 1 | 1 | 0.4 | 3-2 | 4-4 | DAAM | Na$^+$ |
| 2-17 | 0.3 | 1 | 0.1 | 3-1 | 4-1 | DAAM | TEA |
| 2-18 | 0.3 | 1 | 0.1 | 3-2 | 4-1 | DAAM | TEA |

DAAM, DMAAM, and TEA respectively represent diacetone acrylamide diacetone methcrylamide, and tetraethyl ammonium ion.

Preparation of Pigment Dispersions 2-1 to 2-16

Pigment dispersions 2-1 to 2-16 were obtained in the same manner as in the pigment dispersion 1-1 except that each of the 10 percent by mass aqueous solutions of the copolymers 2-1 to 2-16 was used instead of the 10 percent by mass aqueous solution the Copolymer 1-1.

Preparation of Pigment Dispersions 2-17 to 2-19

Pigment dispersions 2-17 to 2-19 were respectively obtained in the same manner as the pigment dispersions 1-14 to 1-16 except that the 10 percent by mass aqueous solutions of the copolymer 2-1 was used instead of the 10 percent by mass aqueous solution the copolymer 1-1.

Preparation of Pigment Dispersions 2-20 to 2-22

The pigment dispersions 1-17 to 1-19 were respectively used as the pigment dispersions 2-20 to 2-22.

The ingredients of the pigment dispersions 2-1 to 2-22 are shown in Table 5.

TABLE 5

| Pigment dispersion 2 | Copolymer 2 | Pigment | Storage stability |
|---|---|---|---|
| 2-1 | 2-1 | Black | A |
| 2-2 | 2-2 | Black | A |
| 2-3 | 2-3 | Black | A |
| 2-4 | 2-4 | Black | B |
| 2-5 | 2-5 | Black | A |
| 2-6 | 2-6 | Black | A |
| 2-7 | 2-7 | Black | A |
| 2-8 | 2-8 | Black | A |
| 2-9 | 2-9 | Black | A |
| 2-10 | 2-10 | Black | A |
| 2-11 | 2-11 | Black | A |
| 2-12 | 2-12 | Black | A |
| 2-13 | 2-13 | Black | B |
| 2-14 | 2-14 | Black | B |
| 2-15 | 2-15 | Black | A |
| 2-16 | 2-16 | Black | B |
| 2-17 | 2-1 | Cyan | A |
| 2-18 | 2-1 | Magenta | A |
| 2-19 | 2-1 | Yellow | A |
| 2-20 | — | Black | — |
| 2-21 | — | Cyan | — |
| 2-22 | — | Magenta | — |

As seen in Table 5, it is confirmed that the pigment dispersions 2-1 to 2-22 have excellent storage stability.

Examples 2-1 to 2-16

Inks were obtained in the same manner as in Example 1-1 except that each of the pigment dispersions 2-1 to 2-16 was used instead of the pigment dispersion 2-1.

Examples 2-17 to 2-19

Inks were obtained in the same manner as in Examples 1-14 to 1-16 except that the pigment dispersions 2-17 to 2-19 were respectively used instead of the pigment dispersions 1-14 to 1-16.

Example 2-20

Ink was obtained in the same manner as in Example 1-17 except that the pigment dispersion 2-20 and 30 percent by mass aqueous solution of the copolymer 2-17 were used instead of the pigment dispersion 1-17 and 30 percent by mass aqueous solution of the copolymer 1-14.

Example 2-21

Ink was obtained in the same manner as in Example 1-18 except that the pigment dispersion 2-21 and 30 percent by mass aqueous solution of the copolymer 2-18 were used instead of the pigment dispersion 1-18 and 30 percent by mass aqueous solution of the copolymer 1-15.

Example 2-22

Ink was obtained in the same manner as in Example 1-19 except that the pigment dispersion 2-22 and 30 percent by mass aqueous solution of the copolymer 2-18 were used instead of the pigment dispersion 1-19 and 30 percent by mass aqueous solution of the copolymer 1-15.

Example 2-23

Ink was obtained in the same manner as in Example 1-20 except that the pigment dispersion 2-17 and 30 percent by mass aqueous solution of the copolymer 2-18 were used instead of the pigment dispersion 1-14 and 30 percent by mass aqueous solution of the copolymer 1-15.

The ingredients of Examples 2-1 to 2-23 are shown in Table 6.

TABLE 6

| Example 2 | Pigment dispersion | Copolymer 2 |
|---|---|---|
| 2-1 | 2-1 | — |
| 2-2 | 2-2 | — |
| 2-3 | 2-3 | — |
| 2-4 | 2-4 | — |
| 2-5 | 2-5 | — |
| 2-6 | 2-6 | — |
| 2-7 | 2-7 | — |
| 2-8 | 2-8 | — |
| 2-9 | 2-9 | — |
| 2-10 | 2-10 | — |
| 2-11 | 2-11 | — |
| 2-12 | 2-12 | — |
| 2-13 | 2-13 | — |
| 2-14 | 2-14 | — |
| 2-15 | 2-15 | — |
| 2-16 | 2-16 | — |
| 2-17 | 2-17 | — |
| 2-18 | 2-18 | — |
| 2-19 | 2-19 | — |
| 2-20 | 2-20 | 2-17 |
| 2-21 | 2-21 | 2-18 |
| 2-22 | 2-22 | 2-18 |
| 2-23 | 2-17 | 2-18 |

Synthesis of Copolymer 3-1

10 percent by mass aqueous solution of the copolymer 3-1 was obtained in the same manner as the copolymer 1-1 except that 9.40 mmol of the compound represented by the following chemical formula II was used instead of 9.40 mmol of the compound represented by the Chemical formula 4-1.

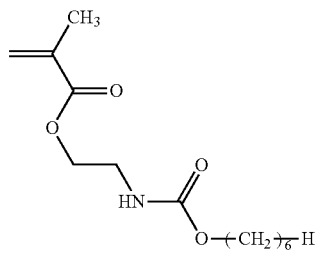

Chemical formula II

The 10 percent by mass aqueous solution of the copolymer 3-1 had a viscosity of 1.7 mPa·s.

Synthesis of Copolymer 3-2

30 percent by mass aqueous solution of the copolymer 3-2 was obtained in the same manner as the copolymer 1-14 except that 140 mmol of the compound represented by the chemical formula II was used instead of 140 mmol of the compound represented by the Chemical formula 4-1. The 30 percent by mass aqueous solution of the copolymer 3-2 was diluted with water. The 10 percent by mass aqueous solution of the copolymer 3-2 had a viscosity of 28.5 mPa·s.

Synthesis of Copolymer 3-3

10 percent by mass aqueous solution of the copolymer 3-3 was obtained in the same manner as the copolymer 2-1 except that 8.51 mmol of the compound represented by the chemical formula II was used instead of 8.51 mmol of the compound represented by the Chemical formula 4-1. The 10 percent by mass aqueous solution of the copolymer 3-3 had a viscosity of 1.9 mPa·s.

Synthesis of Copolymer 3-4

30 percent by mass aqueous solution of the copolymer 3-4 was obtained in the same manner as the copolymer 2-17 except that 129.5 mmol of the compound represented by the chemical formula II was used instead of 129.5 mmol of the compound represented by the Chemical formula 4-1. The 30 percent by mass aqueous solution of the copolymer 3-4 was diluted with water. The 10 percent by mass aqueous solution of the copolymer 3-4 had a viscosity of 32.3 mPa·s.

Preparation of Pigment Dispersions 3-1 to 3-4

Pigment dispersions 3-1 to 3-4 were respectively obtained in the same manner as the pigment dispersions 1-1 and 1-14 to 1-16 except that the copolymer 3-1 was used instead of the copolymer 1-1.

Preparation of Pigment Dispersions 3-5 and 3-6

The pigment dispersions 1-18 and 1-19 were respectively used as the pigment dispersions 3-5 and 3-6.

Preparation of Pigment Dispersions 3-7 to 3-10

Pigment dispersions 3-7 to 3-10 were respectively obtained in the same manner as the pigment dispersions 2-1 and 2-17 to 2-19 except that the copolymer 3-3 was used instead of the copolymer 2-1.

Preparation of Pigment Dispersions 3-11 and 3-12

The pigment dispersions 1-18 and 1-19 were respectively used as the pigment dispersions 3-11 and 3-12.

The ingredients of the pigment dispersions 3-1 to 3-12 are shown in Table 7.

TABLE 7

| Pigment dispersion 3 | Copolymer 3 | Pigment | Storage stability |
|---|---|---|---|
| 3-1 | 3-1 | Black | D |
| 3-2 | 3-1 | Cyan | D |
| 3-3 | 3-1 | Magenta | E |
| 3-4 | 3-1 | Yellow | E |
| 3-5 | — | Cyan | — |
| 3-6 | — | Magenta | — |
| 3-7 | 3-3 | Black | E |
| 3-8 | 3-3 | Cyan | D |
| 3-9 | 3-3 | Magenta | E |
| 3-10 | 3-3 | Yellow | D |
| 3-11 | — | Cyan | — |
| 3-12 | — | Magenta | — |

As seen in Table 7, the pigment dispersions 3-1 to 3-4, and 3-7 to 3-10 have a low level of storage stability since the copolymers 3-1 and 3-3 have no structure unit represented by the Chemical formula 2.

Comparative Examples 1 to 4

Inks were obtained in the same manner as in Examples 1-1 and Examples 1-14 to 1-16 except that the pigment dispersions 3-1 to 3-4 were respectively used instead of the pigment dispersions 1-1 and 1-14 to 1-16.

Comparative Example 5

Ink was obtained in the same manner as in Example 1-18 except that the pigment dispersion 3-5 and 30 percent by mass aqueous solution of the copolymer 3-2 were used instead of the pigment dispersion 1-18 and 30 percent by mass aqueous solution of the copolymer 1-15.

Comparative Example 6

Inks were obtained in the same manner as in Examples 1-18 and 1-19 except that the pigment dispersion 3-6 and 30 percent by mass aqueous solution of the copolymer 3-2 were used instead of the pigment dispersion 1-19 and 30 percent by mass aqueous solution of the copolymer 1-15.

Comparative Example 7

Ink was obtained in the same manner as in Example 1-20 except that the pigment dispersion 3-2 and 30 percent by mass aqueous solution of the copolymer 3-2 were used instead of the pigment dispersion 1-14 and 30 percent by mass aqueous solution of the copolymer 1-15.

Comparative Examples 8 to 11

Inks were obtained in the same manner as in Examples 2-1 and Examples 2-17 to 2-19 except that the pigment dispersions 3-7 to 3-10 were respectively used instead of the pigment dispersions 2-1 and 2-17 to 2-19.

Comparative Example 12

Ink was obtained in the same manner as in Example 2-21 except that the pigment dispersion 3-11 and 30 percent by mass aqueous solution of the copolymer 3-4 were used instead of the pigment dispersion 2-21 and 30 percent by mass aqueous solution of the copolymer 2-18.

Comparative Example 13

Ink was obtained in the same manner as in Example 2-22 except that the pigment dispersion 3-12 and 30 percent by mass aqueous solution of the copolymer 3-4 were used instead of the pigment dispersion 2-22 and 30 percent by mass aqueous solution of the copolymer 2-18.

Comparative Example 14

Ink was obtained in the same manner as in Example 2-23 except that the pigment dispersion 3-6 and 30 percent by mass aqueous solution of the copolymer 3-4 were used instead of the pigment dispersion 2-17 and 30 percent by mass aqueous solution of the copolymer 2-18.

The ingredients of Comparative Examples 1 to 14 are shown in Table 8.

TABLE 8

| Comparative Example | Pigment dispersion 3 | Copolymer 3 |
|---|---|---|
| 1 | 3-1 | — |
| 2 | 3-2 | — |
| 3 | 3-3 | — |
| 4 | 3-4 | — |
| 5 | 3-5 | 3-2 |
| 6 | 3-6 | 3-2 |
| 7 | 3-2 | 3-2 |
| 8 | 3-7 | — |
| 9 | 3-8 | — |
| 10 | 3-9 | — |
| 11 | 3-10 | — |
| 12 | 3-11 | 3-4 |
| 13 | 3-12 | 3-4 |
| 14 | 3-6 | 3-4 |

Next, storage stability, image density, and beading of the inks are evaluated.

Storage Stability of Ink

A glass container was filled with the ink and stored at 70 degrees C. for one week. The viscosity change rate was obtained from the following relation:

|(Viscosity of ink after storage)−(Viscosity of ink before storage)|/(Viscosity of ink before storage)×100, to evaluate the storage stability. The viscosity of the ink at 25 degrees C. was measured at 50 rpm by using a viscometer (RE80L, manufactured by TOKI SANGYO CO., LTD.). The change rate of the viscosity was rated as follows:
A: Less than 5%
B 5% to less than 8%
C: 8% to less than 10%
D: 10% to less than 30%
E: 30% or greater Discharging Stability First, the viscosity η (0 percent) of the initial ink was measured. After 30 g of the ink was charged in a 50 mL glass beaker and left in the environment of 50 degrees C. and 10 percent RH to evaporate water, the viscosity η (30 percent) of the ink that had lost 30 percent from the initial mass was measured. The viscosity of the ink at 25 degrees C. was measured at 50 rpm by using a viscometer (RE80L, manufactured by TOKI SANGYO CO., LTD.). Furthermore, the rate of η (30 percent)/η (0 percent) was calculated to evaluate the discharging stability. Evaluation criteria of the rate are as follows:
level AA: less than 10
level A: from 10 to less than 30
level B: from 30 to less than 100
level C: 100 or greater.

Image Density

An inkjet printer (IPSiO GX5000, manufactured by Ricoh Company Ltd.) was filled with the ink at 23 degrees C. and 50% RH. Thereafter, a chart on which general symbols of 64 point JIS X 0208 (1997) and 2223 were listed was created and printed on recording media by utilizing Microsoft Word 2000 (manufactured by Microsoft Corporation) and the color of the area on which the general symbols were printed were measured by using X-Rite 938 (manufactured by X-Rite Inc.) to evaluate image density. The print mode used was: A modified mode in which the mode "Plain Paper-Standard Fast" was modified to the mode "No Color Calibration" from the user setting for plain paper in the driver installed onto the printer. In addition, the recording media were Xerox 4200 (hereinafter referred to as plain paper 1) (manufactured by Xerox Corporation) and MyPaper (hereinafter referred to as plain paper 2) (manufactured by Ricoh Company Ltd.). Moreover, the symbols of JIS X 0208 (1997) and 2223 were squares with the inside thereof entirely painted. The level of the image density was evaluated according to the following criteria:
A: Image density is 1.25 or greater
B: 1.20 to less than 1.25
C: 1.10 to less than 1.20
D: Less than 1.10
E: Unable to print because pigment was gelated and not dispersed Beading The general symbols of JIS X 0208 (1997) and 2223 of were printed in the same manner as for the image density except that the print mode was changed to the mode "gloss paper-fast" using coated paper (LumiArt Gloss 90 GSM™, manufactured by Stora Enso Japan K.K.) as the recording medium and beading of the printed symbols was evaluated. The level of the beading was evaluated for the rate of the area to which beading occurred to the area on which the general symbols were printed according to the following criteria:
A: Less than 10 percent
B: 10 percent to less than 20 percent
C: 20 percent to less than 40 percent
D: 40 percent to less than 90 percent
E: 90 percent or greater
F: unable to print because pigment was gelated and not dispersed Next, evaluations of the inks about storage stability, image density, and beading are shown in Tables 9 to 11.

TABLE 9

| Example 1 | Storage stability | Discharging stability | Image density Plain paper 1 | Plain paper 2 | Beading |
|---|---|---|---|---|---|
| 1-1 | A | A | A | A | A |
| 1-2 | B | B | A | A | A |
| 1-3 | A | B | A | A | A |
| 1-4 | B | B | A | A | B |
| 1-5 | A | A | A | B | A |
| 1-6 | A | B | A | B | A |
| 1-7 | A | B | B | A | A |
| 1-8 | A | B | B | A | A |
| 1-9 | A | A | A | B | A |
| 1-10 | B | B | A | A | A |
| 1-11 | B | B | B | A | A |
| 1-12 | B | B | A | A | A |
| 1-13 | B | B | B | A | B |
| 1-14 | A | B | A | A | A |
| 1-15 | A | B | A | A | A |
| 1-16 | A | B | A | A | A |
| 1-17 | B | B | B | B | A |
| 1-18 | B | B | B | B | A |
| 1-19 | B | B | B | B | A |
| 1-20 | A | B | A | A | A |

TABLE 10

| Example 2 | Storage stability | Discharging stability | Image density Plain paper 1 | Plain paper 2 | Beading |
|---|---|---|---|---|---|
| 2-1 | A | AA | A | A | A |
| 2-2 | B | AA | A | A | A |
| 2-3 | B | AA | A | A | A |
| 2-4 | B | AA | A | A | A |
| 2-5 | A | AA | A | A | B |
| 2-6 | A | AA | A | B | A |
| 2-7 | A | AA | A | A | B |
| 2-8 | A | AA | A | A | B |
| 2-9 | A | AA | A | B | A |
| 2-10 | A | AA | A | B | A |
| 2-11 | A | A | A | A | A |
| 2-12 | A | AA | B | B | B |
| 2-13 | B | A | A | A | A |
| 2-14 | B | A | A | A | A |
| 2-15 | B | A | A | A | A |
| 2-16 | B | A | A | B | A |
| 2-17 | A | AA | A | A | A |
| 2-18 | A | AA | A | A | A |
| 2-19 | A | AA | A | A | A |
| 2-20 | B | A | B | B | A |
| 2-21 | B | A | B | B | A |
| 2-22 | B | A | B | B | A |
| 2-23 | A | AA | A | A | A |

TABLE 11

| Comparative Example | Storage stability | Discharging stability | Image density Plain paper 1 | Plain paper 2 | Beading |
|---|---|---|---|---|---|
| 1 | D | C | C | C | C |
| 2 | D | C | C | C | E |
| 3 | E | C | F | F | F |
| 4 | E | C | F | F | F |
| 5 | D | C | B | C | E |
| 6 | C | C | D | C | D |

TABLE 11-continued

| Comparative Example | Storage stability | Discharging stability | Image density Plain paper 1 | Plain paper 2 | Beading |
|---|---|---|---|---|---|
| 7 | D | C | C | C | D |
| 8 | E | C | D | D | E |
| 9 | D | C | C | D | E |
| 10 | E | C | C | C | C |
| 11 | D | C | C | C | D |
| 12 | D | C | C | C | B |
| 13 | D | C | C | D | C |
| 14 | D | C | C | C | C |

As seen in the results shown in Tables 9 and 10, it is confirmed that the inks of Examples 1-1 to 1-20 and 2-1 to 2-23 have excellent storage stability, discharging stability, and image density on plain paper and reduce the occurrence of beading when images are formed on coated paper.

As seen in Table 11, the storage stability, discharging stability, and image density on plain paper of the inks of Comparative Examples 1 to 14 deteriorated and beading occurred to images formed on coated paper.

That is, the ink of the present disclosure has excellent storage stability, discharging stability, and image density on plain paper so that occurrence of beading of images formed on coated paper is inhibited by using the ink of the present disclosure.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:

water;

a pigment; and a copolymer, wherein the copolymer comprises a structure unit represented by the following Chemical formula 1,

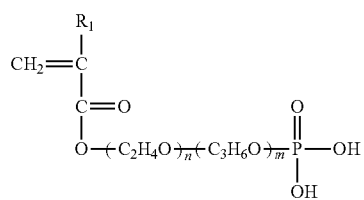

Chemical formula 1 where $R_1$ represents a hydrogen atom or a methyl group, $M_1^+$ and $M_2^+$ each, independently represent monovalent cations, n and m each, independently represent 0 or integers of from 1 to 6 excluding a case where both are 0 and a structure unit represented by the following Chemical formula 2,

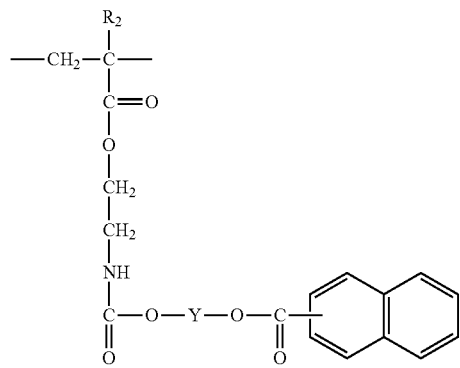

Chemical formula 2 where $R_2$ represents a hydrogen atom or a methyl group and Y represents an alkylene group having 2 to 18 carbon atoms.

2. The ink according to claim 1, wherein a molar ratio of the structure unit represented by the Chemical formula 1 to the structure unit represented by the Chemical formula 2 is from 0.5 to 3.

3. The ink according to claim 1, wherein Y is an alkylene group having 2 to 12 carbon atoms.

4. The ink according to claim 1, wherein the copolymer is synthesized by copolymerizing a monomer represented by the following Chemical formula 3 and a monomer represented by the following Chemical formula 4,

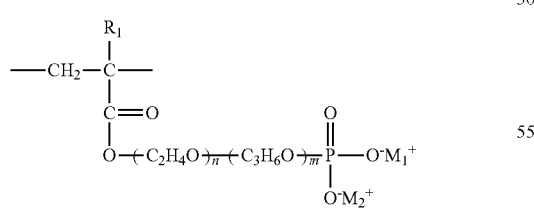

Chemical formula 3

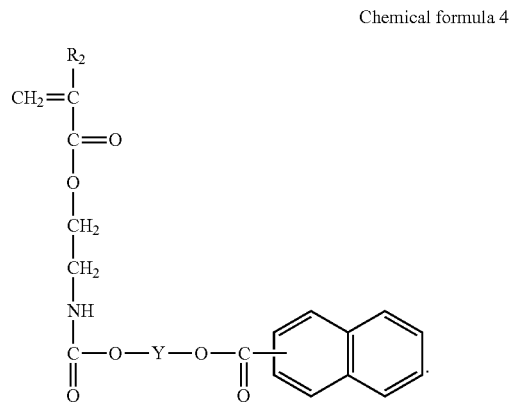

Chemical formula 4

5. The ink according to claim 1, wherein the copolymer further includes a structure unit represented by the following Chemical formula 5, wherein $R_3$ represents a hydrogen atom or a methyl group,

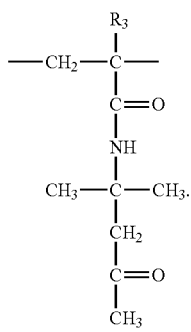

Chemical formula 5

6. The ink according to claim 5, wherein a molar ratio of the structure unit represented by the Chemical formula 5 to the structure unit represented by the Chemical formula 2 is from 0.1 to 4.

7. The ink according to claim 1, further comprising at least one of a water soluble organic solvent or a surfactant.

8. An ink cartridge comprising:
a container to contain the ink of claim 1.

9. An inkjet recording device comprising:
a discharging device to discharge the ink of claim 1.

10. A copolymer comprising:
a structure unit represented by the following Chemical formula 1

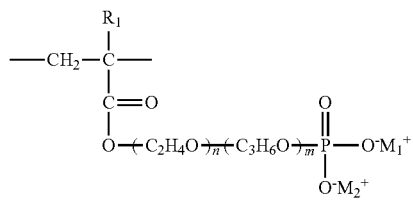

Chemical formula 1 where $R_1$ represents a hydrogen atom or a methyl group, $M_1^+$ and $M_2^+$ each, independently represent monovalent cations, n and m each, independently represent 0 or integers of from 1 to 6 excluding a case where both are 0 and a structure unit represented by the following Chemical formula 2,

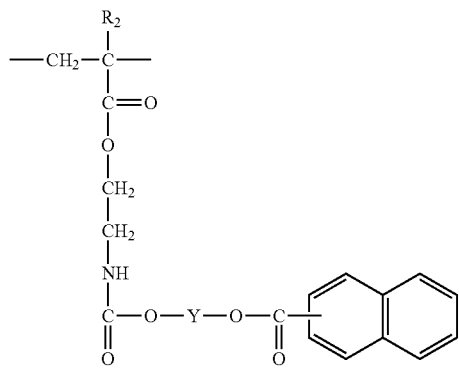

Chemical formula 2 where $R_2$ represents a hydrogen atom or a methyl group and Y represents an alkylene group having 2 to 18 carbon atoms.

* * * * *